US009253438B2

(12) United States Patent  (10) Patent No.: US 9,253,438 B2
Okita et al.  (45) Date of Patent: Feb. 2, 2016

(54) TRANSMISSION MANAGEMENT SYSTEM, TRANSMISSION SYSTEM, COMPUTER PROGRAM PRODUCT, PROGRAM PROVIDING SYSTEM, AND MAINTENANCE SYSTEM

(71) Applicants: Kunio Okita, Kanagawa (JP); Takahiro Asai, Kanagawa (JP)

(72) Inventors: Kunio Okita, Kanagawa (JP); Takahiro Asai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/492,780

(22) Filed: Sep. 22, 2014

(65) Prior Publication Data

US 2015/0009281 A1  Jan. 8, 2015

Related U.S. Application Data

(63) Continuation of application No. 13/203,328, filed as application No. PCT/JP2010/073872 on Dec. 24, 2010, now Pat. No. 8,885,008.

(30) Foreign Application Priority Data

| Dec. 25, 2009 | (JP) | 2009-294691 |
| Dec. 25, 2009 | (JP) | 2009-294709 |
| Sep. 3, 2010 | (JP) | 2010-198144 |
| Sep. 3, 2010 | (JP) | 2010-198162 |
| Oct. 27, 2010 | (JP) | 2010-240699 |
| Oct. 27, 2010 | (JP) | 2010-240704 |

(51) Int. Cl.
*H04N 7/14* (2006.01)
*H04L 12/18* (2006.01)
(Continued)

(52) U.S. Cl.
CPC ............ *H04N 7/147* (2013.01); *H04L 12/1827* (2013.01); *H04L 25/20* (2013.01);
(Continued)

(58) Field of Classification Search
None
See application file for complete search history.

(56) References Cited

U.S. PATENT DOCUMENTS 7,496,690 B2 * 2/2009 Beverly .............. G06F 12/1081
709/214
7,701,884 B2 * 4/2010 Chapweske ........... H04L 1/0002
370/235

(Continued)

FOREIGN PATENT DOCUMENTS

CN  1606290 A  4/2005
CN  101175040 A  5/2008
(Continued)

OTHER PUBLICATIONS

Ichikawa, A., et al., "Cooperative Multicast System for MPEG Video Based on Dynamic Spatio-temporal Scaling," The Transactions of the Institute of Electronics, Information and Communication Engineers B, vol. J83-B, No. 4, pp. 591-606, (Apr. 2000).

(Continued)

*Primary Examiner* — Maria El-Zoobi
(74) *Attorney, Agent, or Firm* — Oblon, McClelland, Maier & Neustadt, L.L.P.

(57) ABSTRACT

A transmission management system includes: a relay device management unit that manages relay device-specifying information for specifying each relay device on a communication network, for every piece of relay device-identification information for identifying each relay device; a terminal management unit that manages terminal-specifying information for specifying each transmission terminal on the communication network; a receiving unit that receives, from a transmission terminal as a predetermined request source, terminal-identification information for the request source and terminal-identification information for a transmission terminal as a destination; an extracting unit that extracts the terminal-specifying information of a corresponding transmission terminal based on the terminal-identification information for the request source; and a primary selecting unit that selects two or more pieces of relay device-identification information of relay devices, to which relay device-specifying information representing top two or more IP addresses closest to the IP address represented by the extracted terminal-specifying information, is allocated.

8 Claims, 20 Drawing Sheets

(51) Int. Cl.
*H04L 25/20* (2006.01)
*H04L 29/08* (2006.01)
H04L 29/12 (2006.01)
H04L 29/06 (2006.01)

(52) U.S. Cl.
CPC ............ *H04L67/1095* (2013.01); *H04N 7/142* (2013.01); *H04N 7/148* (2013.01); *H04L 61/6068* (2013.01); *H04L 65/403* (2013.01)

(56) References Cited

U.S. PATENT DOCUMENTS

| | | | |
|---|---|---|---|
| 8,885,008 B2 * | 11/2014 | Okita | ................ H04L 12/1827 348/14.01 |
| 2003/0053450 A1 | 3/2003 | Kubota et al. | |
| 2005/0232151 A1 * | 10/2005 | Chapweske | ........... H04L 1/0002 370/231 |
| 2008/0240027 A1 | 10/2008 | Ishii | |
| 2010/0131670 A1 * | 5/2010 | Ishii | ........................ H04L 47/10 709/233 |
| 2010/0165846 A1 * | 7/2010 | Yamaguchi | ........ H04B 7/15592 370/236 |
| 2011/0004655 A1 * | 1/2011 | Okita | ........................ G06F 9/54 709/203 |
| 2011/0105017 A1 * | 5/2011 | Takada | ............. H04L 12/40013 455/18 |
| 2012/0137354 A1 | 5/2012 | Okita | |
| 2013/0222528 A1 | 8/2013 | Hinohara et al. | |

FOREIGN PATENT DOCUMENTS

| | | |
|---|---|---|
| CN | 101459530 A | 6/2009 |
| JP | 05-014396 A | 1/1993 |
| JP | 2003 324488 | 11/2003 |
| JP | 2008 118339 | 5/2008 |
| JP | 2008-131346 A | 6/2008 |
| JP | 2008 227577 | 9/2008 |
| JP | 2009 054139 | 3/2009 |

OTHER PUBLICATIONS

International Search Report issued Mar. 15, 2011 in PCT/JP10/073872 filed Dec. 24, 2010.
Chinese Office Action issued May 9, 2013, in China Patent Application No. 201080009238.0 (with English translation).
Office Action issued Aug. 19, 2014 in Japanese Patent Application No. 2010-240699.

* cited by examiner

FIG.8
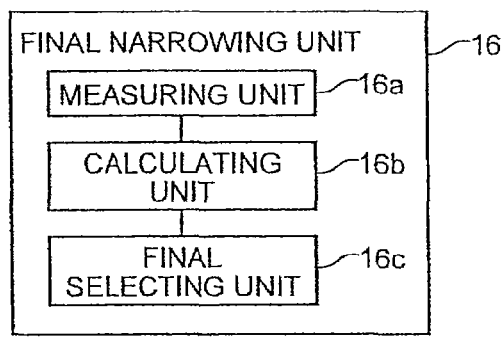
FIG.9
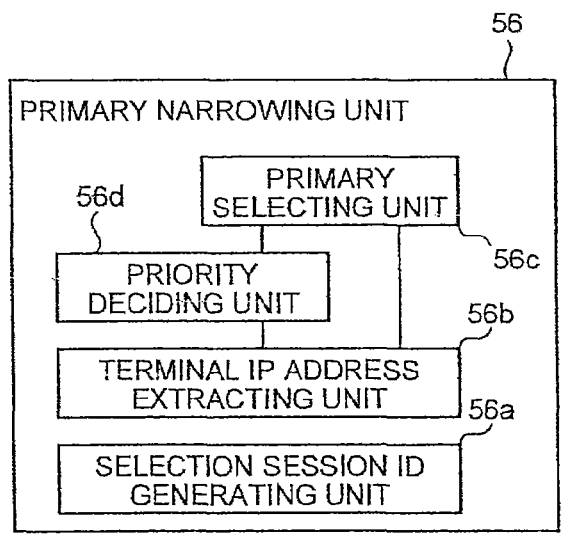
FIG.10
QUALITY CHANGE MANAGEMENT TABLE
| IP ADDRESS OF RELAY DESTINATION TERMINAL | IMAGE QUALITY OF IMAGE DATA TO BE RELAYED (QUALITY OF IMAGE) |
|---|---|
| 1.3.2.4 | HIGH QUALITY |
| 1.3.1.3 | LOW QUALITY |
| 1.3.2.3 | INTERMEDIATE QUALITY |
| ... | ... |

FIG.11

RELAY DEVICE MANAGEMENT TABLE

| RELAY DEVICE ID | OPERATION STATE | RECEPTION DATE AND TIME | IP ADDRESS OF RELAY DEVICE | MAXIMUM DATA TRANSMISSION RATE [Mbps] |
|---|---|---|---|---|
| 111a | ON LINE | 2009. 11. 10. 13:00 | 1. 2. 1. 2 | 100 |
| 111b | ON LINE | 2009. 11. 10. 13:10 | 1. 2. 2. 2 | 1000 |
| 111c | OFF LINE | 2009. 11. 10. 13:20 | 1. 3. 1. 2 | 100 |
| 111d | ON LINE | 2009. 11. 10. 13:30 | 1. 3. 2. 2 | 10 |

FIG.12

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.13

TERMINAL MANAGEMENT TABLE

| TERMINAL ID | DESTINATION NAME | OPERATION STATE | RECEPTION DATE AND TIME | IP ADDRESS OF TERMINAL |
|---|---|---|---|---|
| 01aa | AA TERMINAL IN TOKYO OFFICE IN JAPAN | ON LINE (CALL ENABLE) | 2009. 11. 10. 13:40 | 1.2.1.3 |
| 01ab | AB TERMINAL IN TOKYO OFFICE IN JAPAN | OFF LINE | 2009. 11. 09. 12:00 | 1.2.1.4 |
| ... | ... | ... | ... | ... |
| 01ba | BA TERMINAL IN OSAKA OFFICE IN JAPAN | ON LINE (TEMPORARY HALT) | 2009. 11. 10. 13:45 | 1.2.2.3 |
| 01bb | BB TERMINAL IN OSAKA OFFICE IN JAPAN | ON LINE (CALL ENABLE) | 2009. 11. 10. 13:50 | 1.2.2.4 |
| ... | ... | ... | ... | ... |
| 01ca | CA TERMINAL IN NEW YORK OFFICE IN USA | OFF LINE | 2009. 11. 10. 12:45 | 1.3.1.3 |
| 01cb | CB TERMINAL IN NEW YORK OFFICE IN USA | ON LINE (BUSY) | 2009. 11. 10. 13:55 | 1.3.1.4 |
| ... | ... | ... | ... | ... |
| 01da | DA TERMINAL IN WASHINGTON OFFICE IN USA | ON LINE (BUSY) | 2009. 11. 08. 12:45 | 1.3.2.3 |
| 01db | DB TERMINAL IN WASHINGTON OFFICE IN USA | ON LINE | 2009. 11. 10. 12:45 | 1.3.2.4 |
| ... | ... | ... | ... | ... |

FIG.14

DESTINATION LIST MANAGEMENT TABLE

| REQUEST SOURCE TERMINAL ID | DESTINATION TERMINAL ID |
|---|---|
| 01aa | 01ab,···, 01ba, 01bb, ···, 01ca, 01cb, 01da, 01db,··· |
| 01ab | 01aa, 01ca, 01cb |
| 01ba | 01aa, 01ab, 01ca, 01cb, 01da, 01db |
| ... | ... |
| 01db | 01aa, 01ab, 01ba,···, 01da, 01ca, 01cb, ···, 01da |

FIG.15

SESSION MANAGEMENT TABLE

| SESSION ID FOR SELECTION | RELAY DEVICE ID | REQUEST SOURCE TERMINAL ID | DESTINATION TERMINAL ID | DELAY TIME [ms] | DATE AND TIME WHEN DELAY INFORMATION IS RECEIVED |
|---|---|---|---|---|---|
| se1 | 111a | 01aa | 01db | 200 | 2009. 11. 10. 14:00 |
| se2 | 111b | 01ba | 01ca | 50 | 2009. 11. 10. 14:10 |
| se3 | 111d | 01bb | 01da | 400 | 2009. 11. 10. 14:20 |
| ... | ... | ... | ... | ... | ... |

FIG.16

ADDRESS PRIORITY MANAGEMENT TABLE

| SAME/DIFFERENT PART OF DOT ADDRESS | ADDRESS PRIORITY |
|---|---|
| SAME. SAME. SAME. DIFFERENT | 5 |
| SAME. SAME. DIFFERENT. - | 3 |
| SAME. DIFFERENT. -. - | 1 |
| DIFFERENT. -. -. - | 0 |

FIG.17

TRANSMISSION RATE AND PRIORITY MANAGEMENT TABLE

| MAXIMUM DATA TRANSMISSION RATE [Mbps] IN RELAY DEVICE | TRANSMISSION RATE PRIORITY |
|---|---|
| 1000 TO | 5 |
| 100 TO 1000 | 3 |
| 10 TO 100 | 1 |
| TO 10 | 0 |

FIG.18

QUALITY MANAGEMENT TABLE

| DELAY TIME [ms] | IMAGE QUALITY OF IMAGE DATA (QUALITY OF IMAGE) |
|---|---|
| 0 TO 100 | HIGH QUALITY |
| 100 TO 300 | INTERMEDIATE QUALITY |
| 300 TO 500 | LOW QUALITY |
| 500 TO | (HALT) |

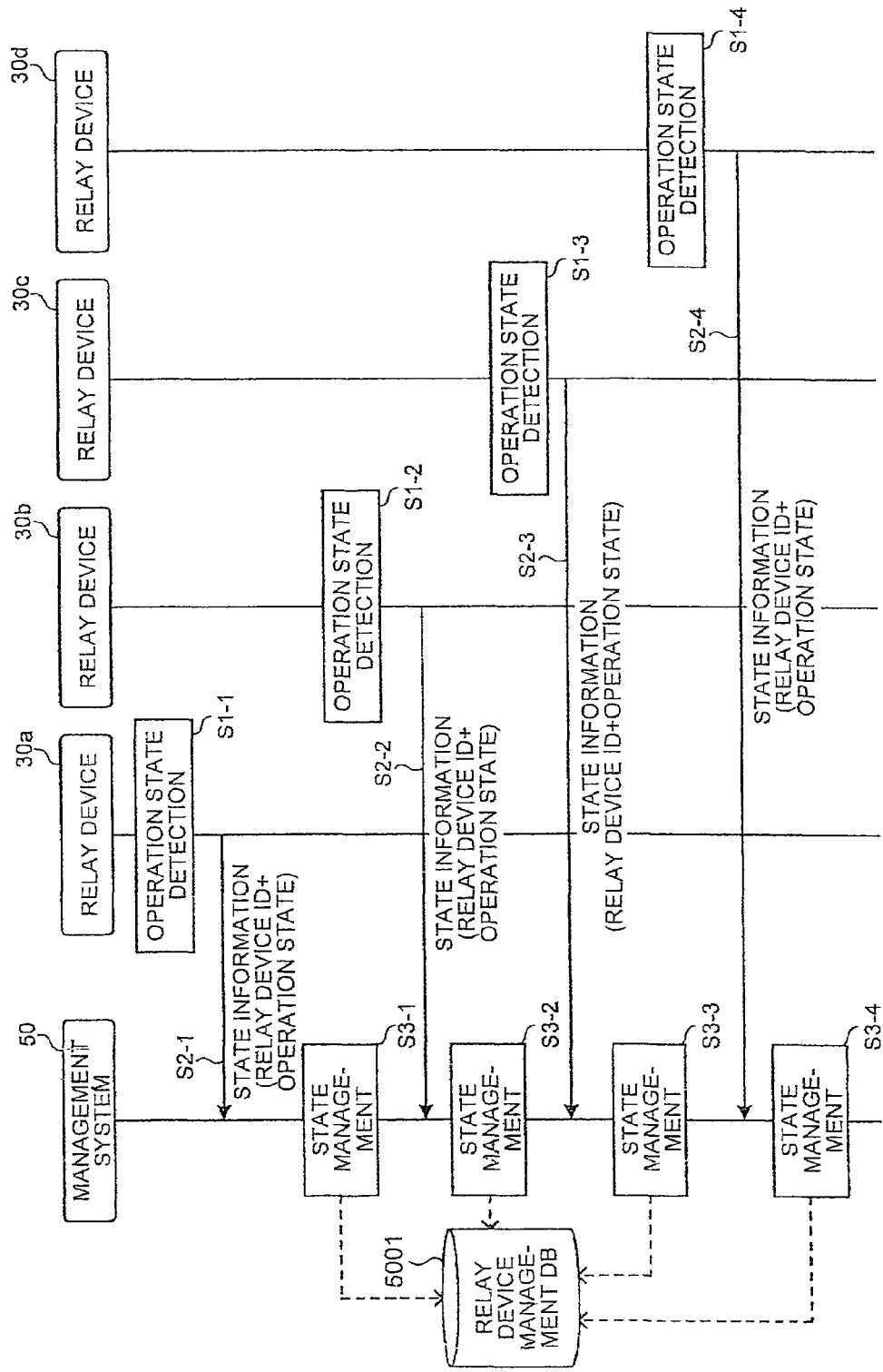

FIG.23

| RELAY DEVICE ID | ADDRESS PRIORITY | | POINT OF TRANSMISSION RATE PRIORITY | INTEGRATED POINT |
| --- | --- | --- | --- | --- |
| | POINT ON TERMINAL 10aa | POINT ON TERMINAL 10db | | |
| 111a | 5 | 1 | 3 | 8 |
| 111b | 3 | 1 | 5 | 8 |
| 111c | - | - | - | - |
| 111d | 1 | 5 | 1 | 6 |

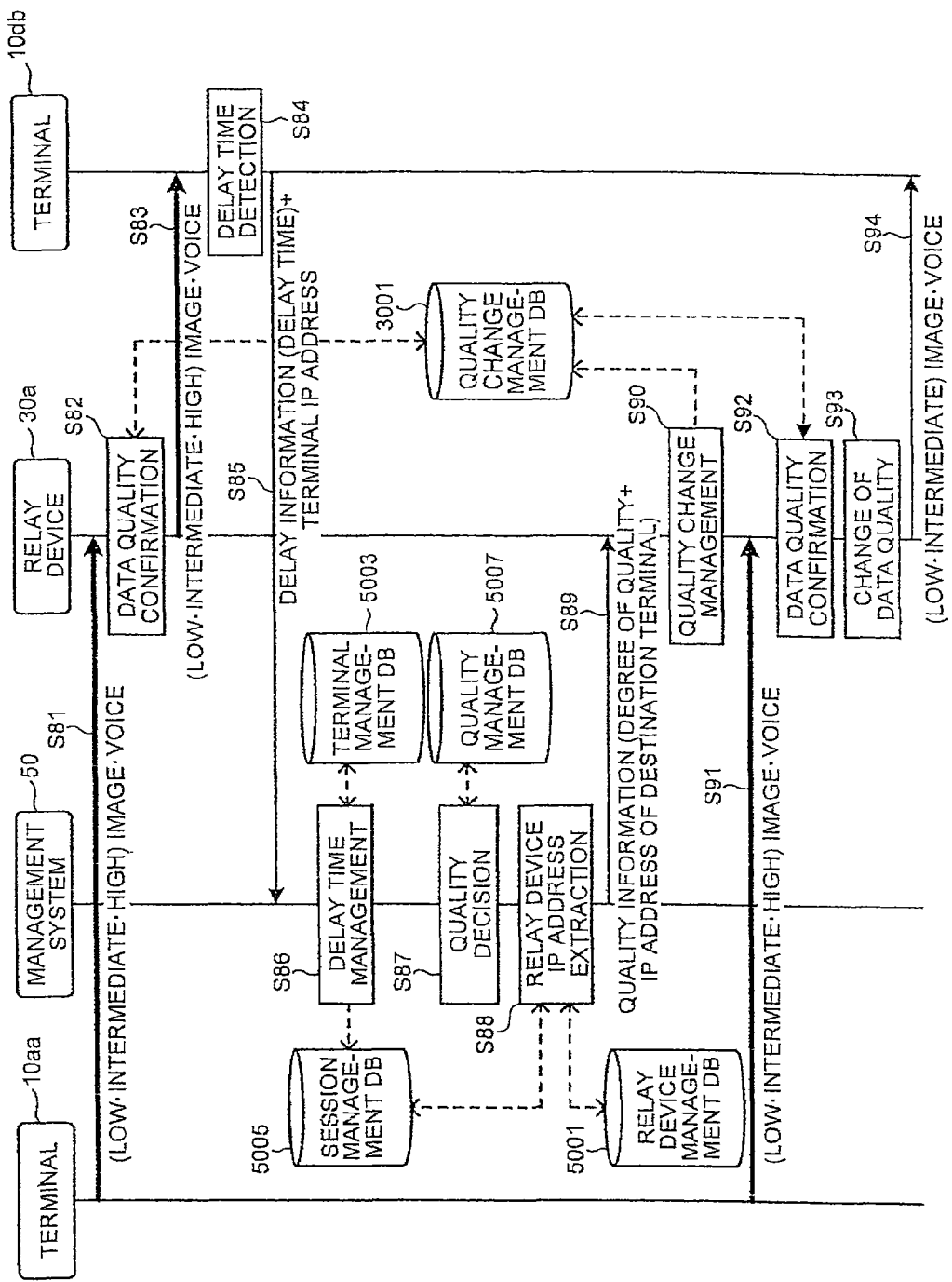

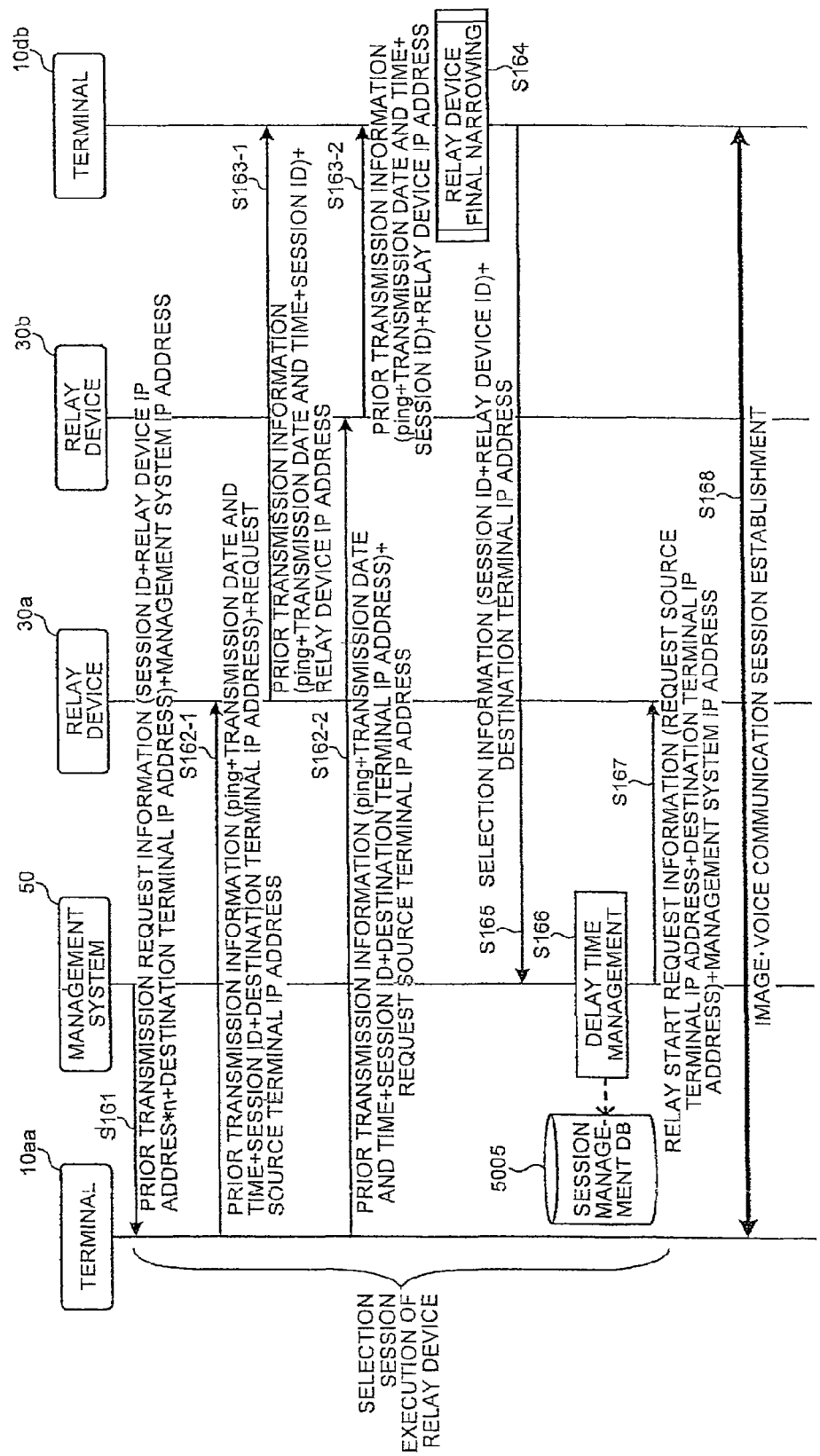

TRANSMISSION MANAGEMENT SYSTEM, TRANSMISSION SYSTEM, COMPUTER PROGRAM PRODUCT, PROGRAM PROVIDING SYSTEM, AND MAINTENANCE SYSTEM

CROSS-REFERENCE TO RELATED APPLICATIONS

The present application is a continuation application of U.S. patent application Ser. No. 13/203,328, filed Aug. 25, 2011, which is a National Stage application of PCT/JP2010/073872 filed on Dec. 24, 2010, and claims priority to Japanese Patent Application Nos. 2010-240704, filed Oct. 27, 2010; 2010-240699, filed Oct. 27, 2010; 2010-198162, filed Sep. 3, 2010; 2010-198144, filed Sep. 3, 2010; 2009-294709, filed Dec. 25, 2009; 2009-294691, filed Dec. 25, 2009. The entire contents of the above-identified applications are incorporated herein by reference.

TECHNICAL FIELD

The present invention relates to a technique of selecting a relay device that actually relays contents data from among a plurality of replay devices capable of relaying contents data between a plurality of transmission terminals.

BACKGROUND ART

As an example of a transmission system in which contents data is transmitted or received between a plurality of transmission terminals through relay devices, there is a video conference system in which a video conference takes place via a communication network such as the Internet. Recently, the need for a video conference system is growing because of a tendency of saving expenses and time for business trips. In the video conference system, a plurality of video conference terminals are used as an example of the transmission terminals. The video conference can be made by reception and transmission of image data and voice data between the video conference terminals.

Further, the recent enhancement of the broadband environment made it possible to transmit and receive high-quality image data and high-quality voice data. Thus, a situation of the other party of the video conference is easily recognized, which leads to improved fidelity of communication.

However, when a large number of video conferences are conducted via the communication network or when the image data or the voice data is received through the narrowband channel on the communication network, the image data or the voice data may be delayed. If the image data or the voice data is delayed by 0.5 seconds or more, it is reported that the user of the video conference feels stress during the conversation. Thus, in spite of the recent enhancement of the broadband environment, it happens sometimes that the user cannot perform the satisfactory video conference.

In recent years, in connection with the video conference system, relay devices that relay the image data and the voice data between the video conference terminals are installed for every local area network (LAN) in the communication network. When the video conference communication process is performed in distributed manner through these relay devices, a load on each relay device can be reduced and a data transmission amount of the image data or the voice data to be relayed can be distributed.

Conventionally, in selecting and using one relay device from among a plurality of relay devices, a relay device on the same LAN as the video conference terminal that participates in the video conference, was used. That is, by selecting a relay device having an IP address close to an IP address of the video conference terminal, transmission and reception of the high-quality image data is enabled through the selected relay device (see Japanese Patent Application Laid-open No. 2008-227577).

However, in the conventional video conference system, the relay device is selected under the presumption that the high-quality image data or the high-quality voice data can be transmitted and received if the relay device having the IP address close to the IP address of the video conference terminal is used. Thus, it may not well-suited for the actual communication network environment. For example, even if the IP address of the video conference terminal and the IP address of the relay device are obtained in advance, since it is difficult to grasp access states of all communication networks in the world, the presumption is not always correct. For example, there may be disconnections in actual environment. Therefore, it is difficult to transmit and receive the image data or the voice data of as high quality as possible under the actual communication network environment.

DISCLOSURE OF INVENTION

According to one aspect of the present invention, there is provided a transmission management system that provides a support of finally narrowing relay devices, which relay at least one of image data and voice data to be communicated between a plurality of transmission terminals via a communication network, down to one relay device, the system including: a relay device management unit that manages relay device-specifying information representing an IP address used to specify each of the relay devices on the communication network or a fully qualified domain name (FQDN) corresponding to the IP address, for every piece of relay device identification information for identifying each of the relay devices; a terminal management unit that manages terminal-specifying information representing an IP address used to specify each of the transmission terminals on the communication network or a FQDN corresponding to the IP address, for every piece of terminal identification information for identifying each of the transmission terminals; an identification information receiving unit that receives, from a transmission terminal as a predetermined request source, terminal identification information for identifying the transmission terminal as the request source and terminal identification information for identifying a transmission terminal as a destination; an extracting unit that extracts the terminal-specifying information of a corresponding transmission terminal of the transmission terminals by searching the terminal management unit based on at least one of the terminal identification information for identifying the request source and the terminal identification information for identifying the destination; and a primary selecting unit that searches the relay device management unit based on an IP address represented by the extracted terminal-specifying information or an IP address corresponding to a FQDN represented by the extracted terminal-specifying information to select two or more pieces of relay device identification information of two or more of the relay devices, to which relay device-specifying information representing top two or more IP addresses closest to the IP address represented by the extracted terminal-specifying information or the IP address corresponding to the FQDN represented by the extracted terminal-specifying information or representing FQDNs corresponding to the top two or more IP addresses, is allocated, so that a primary narrowing process is performed before finally narrowing the relay devices down to one relay device.

BRIEF DESCRIPTION OF DRAWINGS

FIG. 8 is a functional configuration diagram of a final narrowing unit.

FIG. 9 is a functional configuration diagram of a primary narrowing unit.

FIG. 10 is a conceptual diagram illustrating a quality change management table.

FIG. 11 is a conceptual diagram illustrating a relay device management table.

FIG. 12 is a conceptual diagram illustrating a terminal authentication management table.

FIG. 13 is a conceptual diagram illustrating a terminal management table.

FIG. 14 is a conceptual diagram illustrating a destination list management table.

FIG. 15 is a conceptual diagram illustrating a session management table.

FIG. 16 is a conceptual diagram illustrating an address priority management table.

FIG. 17 is a conceptual diagram illustrating a transmission rate priority management table.

FIG. 18 is a conceptual diagram illustrating a quality management table.

FIG. 19 is a sequence diagram illustrating a process of managing state information representing an operation state of each relay device.

FIG. 23 is a diagram illustrating a point calculation state when performing a process of narrowing down the relay devices.

FIG. 26 is a sequence diagram illustrating a process of transmitting and receiving image data and voice data between the transmission terminals.

FIG. 27 is a sequence diagram illustrating a process of selecting a relay device at a transmission terminal according to a second exemplary embodiment of the present invention.

BEST MODE(S) FOR CARRYING OUT THE INVENTION

Hereinafter, exemplary embodiments of the present invention will be described with reference to the accompanying drawings.

First Embodiment

Figure 1:
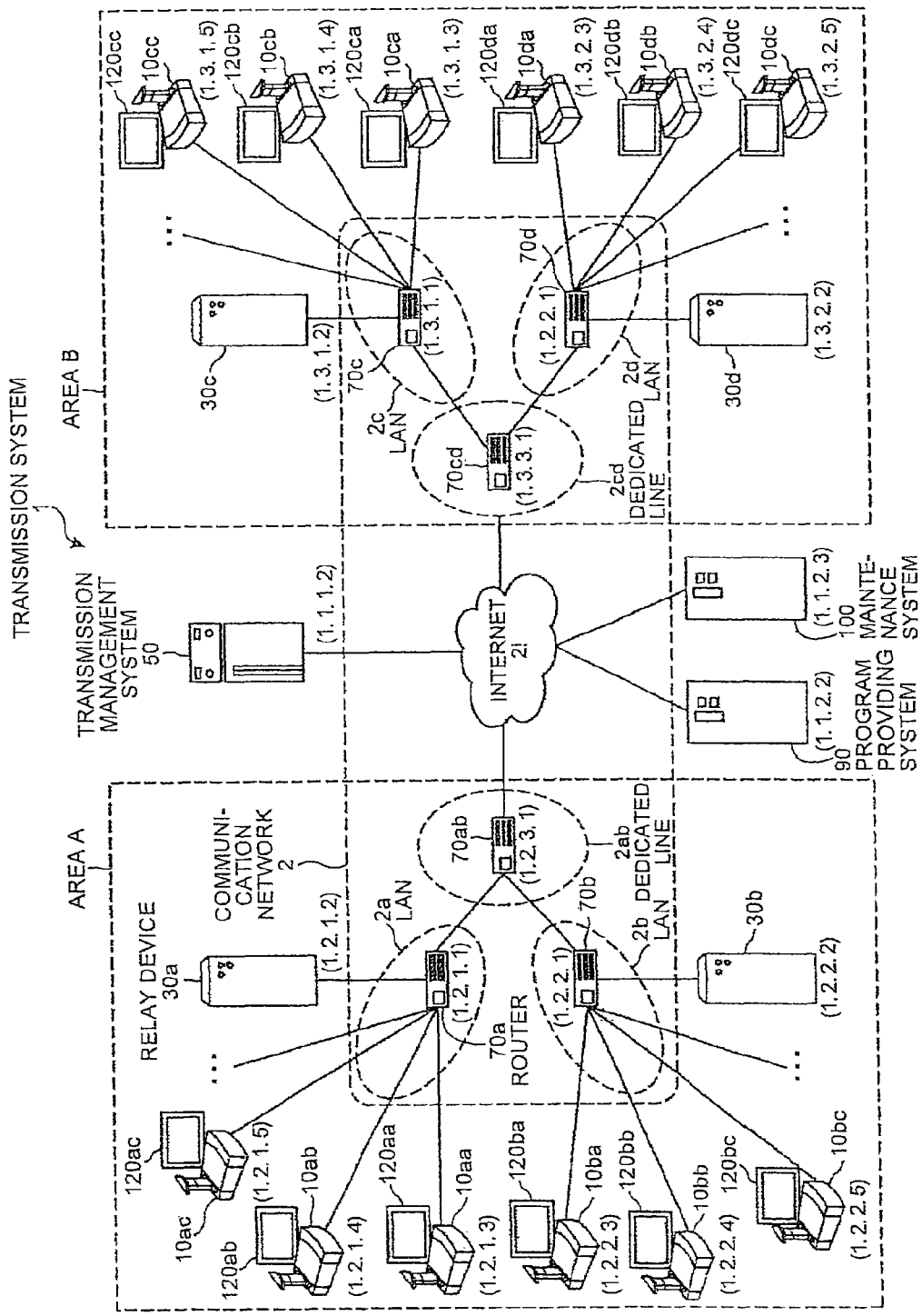
FIG. 1 is a schematic diagram of a transmission system according to a first exemplary embodiment of the present invention.
Figure 2:
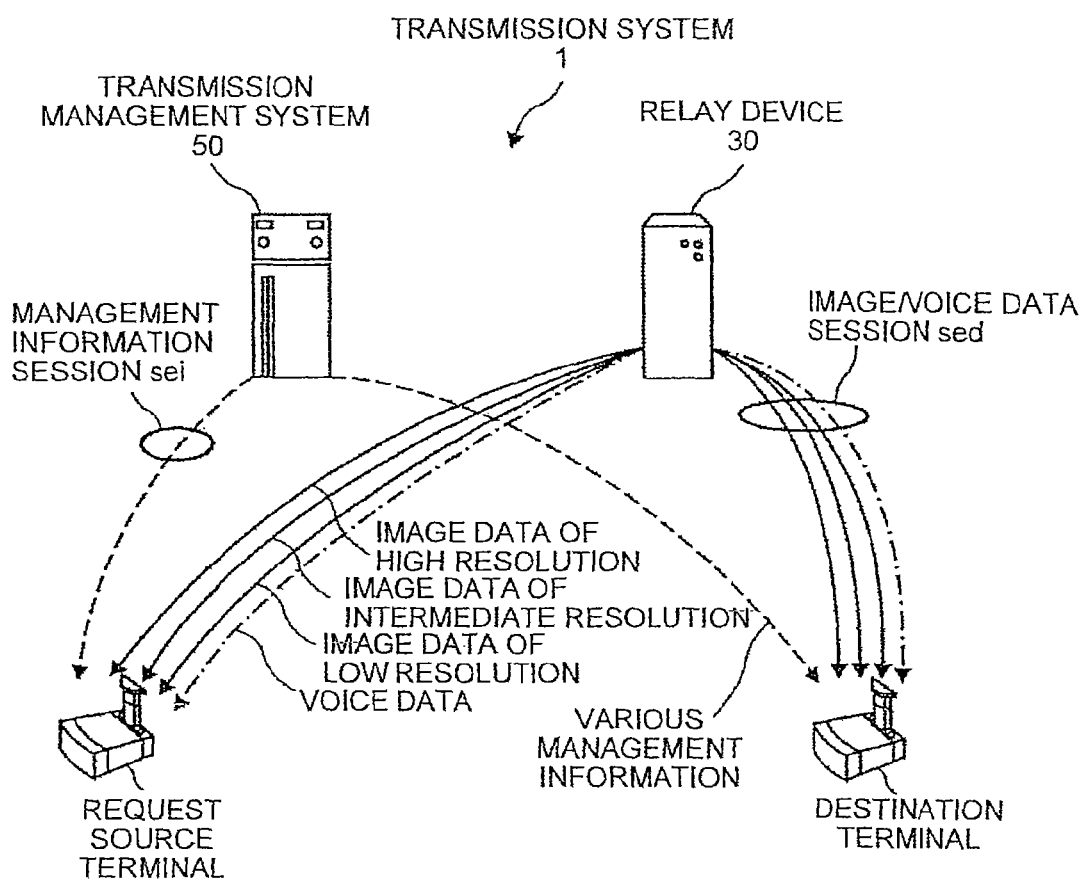
FIG. 2 is a conceptual diagram illustrating a transmission/reception state of image data, voice data, and a variety of management information in a transmission system.
Figures 3A, 3B, 3C:
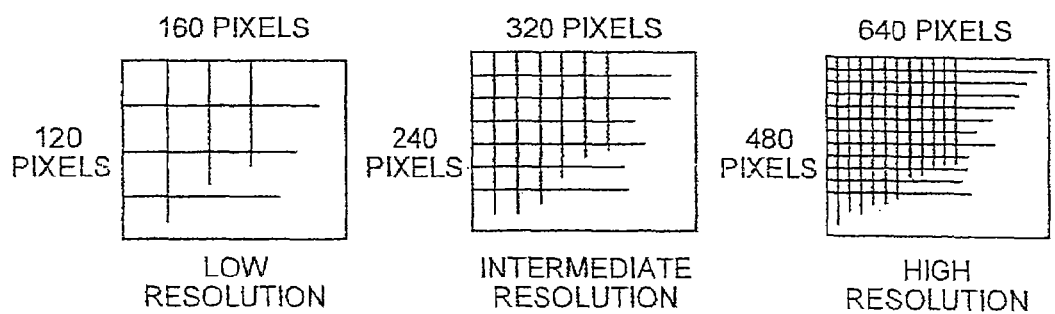
FIGS. 3A to 3C are conceptual diagrams for explaining image quality of image data.

Hereinafter, a first exemplary embodiment of the present invention will be described with reference to FIGS. 1 to 26. The Entire Configuration of the Exemplary Embodiment FIG. 1 is a schematic diagram of a transmission system 1 according to the present exemplary embodiment of the present invention. FIG. 2 is a conceptual diagram illustrating a transmission/reception state of image data, voice data, and a variety of management information in a transmission system. FIGS. 3A to 3C are conceptual diagrams for explaining the image quality of image data.

The transmission system includes a data providing system that transmits contents data in one direction from one transmission terminal to another transmission terminal through a transmission management system and a communication system that transmits information or a feeling between a plurality of transmission terminals through the transmission management system. The communication system refers to a system that transmits information or a feeling between a plurality of communication terminals (corresponding to the "transmission terminals") through the communication management system (corresponding to the "transmission management system"). Examples of the communication system include a video conference system and a television telephone system.

In the present exemplary embodiment, the transmission system, the transmission management system, and the transmission terminal will be described under the assumption that a video conference system is used as an example of the communication system, a video conference management system is used as an example of the communication management system, and video conference terminals are used as an example of the communication terminals. That is, the transmission terminal and the transmission management system of the present invention are applied not only to the video conference system but also to the communication system or the transmission system.

First, a transmission system illustrated in FIG. 1 includes a plurality of transmission terminals 10aa, 10ab, . . . , displays 120aa, 120ab, . . . , for the transmission terminals 10aa, 10ab, . . . , respectively, a plurality of relay devices 30a, 30b, 30c, and 30d, a transmission management system 50, a program providing system 90, and a maintenance system 100.

The plurality of terminals 10 performs transmission based on transmission or reception of image data and voice data as an example of contents data.

Hereinafter, the "transmission terminal" is referred to as simply a "terminal," and the "transmission management system" is referred to as simply a "management system." An arbitrary terminal among the plurality of terminals 10aa, 10ab, . . . , is referred to as a "terminal 10," and an arbitrary display among the plurality of displays 120aa, 120ab, . . . , is referred to as a "display 120." An arbitrary relay device among the plurality of relay devices 30a, 30b, 30c, and 30d is referred to as a "relay device 30." A terminal that is a request source that requests the start of the video conference is referred to as a "request source terminal." A terminal that is a destination (a relay destination) serving as a request destination is referred to as a "destination terminal."

As illustrated in FIG. 2, in the transmission system 1, a management information session sei for transmitting and receiving a variety of management information is established between the request source terminal and the destination terminal through a management system 50. Four sessions for transmitting and receiving four items of data including high-resolution image data, intermediate-resolution image data, low-resolution image data, and voice data, respectively, are established between the request source terminal and the destination terminal through the relay device 30. The four sessions are collectively designated as an image/voice data session sed.

The image resolution of the image data dealt with in the present exemplary embodiment will be described. There are a low-resolution image that includes 160×120 pixels and is a base image as illustrated in FIG. 3A, an intermediate-resolution image that includes 320×240 pixels as illustrated in FIG. 3B, and a high-resolution image that includes 640×480 pixels as illustrated in FIG. 3C. Of these, if a narrow band is used, the low-quality image data including only the low-resolution image data that is the base image is relayed. If a relatively broad band is used, the intermediate-quality image data including the low-resolution image data that is the base image and the intermediate-resolution image data is relayed. If a very broad band is used, the high-quality image data including the low-resolution image data that is the base image, the intermediate-resolution image data, and the high-resolution image data is relayed.

The relay device 30 illustrated in FIG. 1 relays the contents data between a plurality of terminals. The management system 50 performs management on login authentication of the terminal 10, a call state of the terminal 10, and a destination list, and a communication state of the relay device 30 in an integrated fashion. The image of the image data may include either or both of a moving picture and a still picture.

A plurality of routers 70a, 70b, 70c, 70d, 70ab, and 70cd selects an optimum channel of the image data and the voice data. Hereinafter, an arbitrary router among the routers 70a, 70b, 70c, 70d, 70ab, and 70cd is referred to as a "router 70."

The program providing system 90 includes a hard disk (HD) which will be described later. The program providing system 90 stores a terminal program for implementing a variety of functions in the terminal 10 (or for causing the terminal 10 to function as a variety of means) and transmits the terminal program to the terminal 10. A hard disk 204 of the program providing system 90 stores a relay device program for implementing a variety of functions in the relay device 30 (or for causing the relay device 30 to function as a variety of means) and transmits the relay device program to the relay device 30. The hard disk 204 of the program providing system 90 also stores a transmission management program for implementing a variety of functions in the management system 50 (or for causing the management system 50 to function as a variety of means) and transmits the transmission management program to the management system 50.

The maintenance system 100 is a computer for performing the maintenance, management, and a repair on at least one of the terminal 10, the relay device 30, the management system 50, and the program providing system 90. For example, if the maintenance system 100 is installed domestically, and the terminal 10, the relay device 30, the management system 50, or the program providing system 90 is installed overseas, the maintenance system 100 remotely performs a maintenance work such as the maintenance, the management, and the repair on at least one of the terminal 10, the relay device 30, the management system 50, and the program providing system 90 via a communication network 2. The maintenance system 100 also performs a maintenance work such as management of a model number, a manufacturing number, a sale destination, a repair check, or a failure history in at least one of the terminal 10, the relay device 30, the management system 50, and the program providing system 90 without involving the communication network 2.

The terminals 10aa, 10ab, 10ac, ..., the relay device 30a, and the router 70a are connected via a LAN 2a to mutually perform communications. The terminals 10ba, 10bb, 10bc, ..., the relay device 30b, and the router 70b are connected via a LAN 2b to mutually perform communications. The LAN 2a and the LAN 2b are connected to each other by a dedicated line 2ab including the router 70ab and constructed within a predetermined area A. For example, the area A is Japan, the LAN 2a is constructed within a business office in Tokyo, and the LAN 2b is constructed within a business office in Osaka.

The terminals 10ca, 10cb, 10cc, ..., the relay device 30c, and the router 70c are connected via a LAN 2c to mutually perform communications. The terminals 10da, 10db, 10dc, ..., the relay device 30d, and the router 70d are connected via a LAN 2d to mutually perform communications. The LAN 2c and the LAN 2d are connected to each other by a dedicated line 2cd including the router 70cd and constructed within a predetermined area B. For example, the area B is the United States of America (USA), the LAN 2c is constructed within a business office in New York, and the LAN 2d is constructed within a business office in Washington. The area A and the area B are connected to each other to perform communications through the routers 70ab and 70cd via the Internet 2i.

The management system 50 and the program providing system 90 are connected to perform communications with the terminal 10 and the relay device 30 via the Internet 2i. The management system 50 and the program providing system 90 may be installed in the area A, the area B, or any other area.

In the present exemplary embodiment, the communication network 2 of the present exemplary embodiment is constructed by the LAN 2a, the LAN 2b, the dedicated line 2ab, the Internet 2i, the dedicated line 2cd, the LAN 2c, and the LAN 2d. The communication network 2 is not limited to wire-line communication but may have a site where wireless communication such as wireless fidelity (WiFi) or Bluetooth (a registered trademark) is performed.

In FIG. 1, four-set numbers indicated below each terminal 10, each relay device 30, the management system 50, each router 70, and the program providing system 90 simply represent typical IP addresses in the IPv4. For example, the IP address of the terminal 10aa is "1.2.1.3." The IPv6 may be used instead of the IPv4, but for simplification of the description, a description will be made in connection with the IPv4.

Each of the terminals 10 may be used for a call in the same room, a call between the indoor and the outdoor, and a call between the outdoor and the outdoor as well as a call between a plurality of business offices and a call between different rooms within the same business office. When each of the terminals 10 is used outdoor, wireless communication is performed through a cellular phone communication network.

A Hardware Configuration of the Exemplary Embodiment

Next, a hardware configuration of an exemplary embodiment will be described. The present exemplary embodiment is described in connection with a case in which if a delay occurs when the terminal 10 as a destination (a relay destination) receives the image data, the image resolution of the image data is changed by the relay device 30, and then the image data is transmitted to the terminal 10 as the relay destination.

Figure 4:
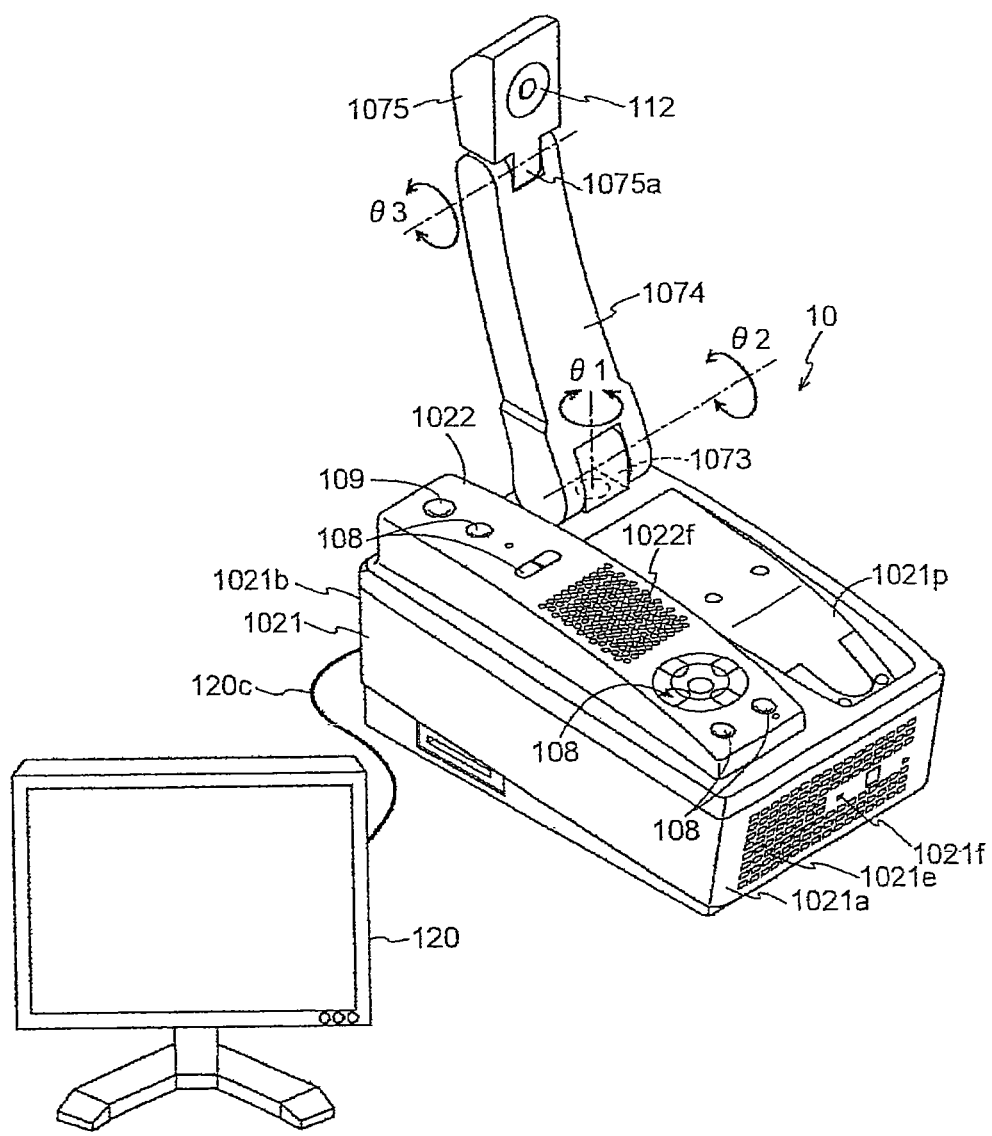
FIG. 4 is an external view of a terminal according to the present exemplary embodiment.

FIG. 4 is a diagram illustrating the appearance of a terminal according to the present exemplary embodiment. As illustrated in FIG. 4, the terminal 10 includes a case 1021, an arm 1074, and a camera housing 1075. A plurality of intake holes 1021e is formed in nearly the whole surface of a front sidewall 1021a of the case 1021, and a plurality of exhaust holes (not shown) is formed in nearly the whole surface of a rear sidewall 1021b of the case 1021. As a cooling fan disposed in the case 1021 is driven, the outside air in front of the terminal 10 is taken in through the intake holes 1021e and exhausted through the back of the terminal 10 through the exhaust holes. A sound absorption hole 1021f is formed in the center of the front sidewall 1021a, and a sound such as a voice, and a noise is absorbed by a built-in microphone which will be described later.

When the case 1021 is viewed from the front, an operation panel 1022 is formed on the left. On the operation panel 1022, an operation button 108 which will be described later and a power switch 109 which will be described later are disposed, and a plurality of voice output holes 1022f for allowing a sound output from a built-in speaker 115 which will be described later to pass is formed. Further, when the case 1021 is viewed from the front, an accommodation section 1021p serving as a concave portion for accommodating the arm 1074 and the camera housing 1075 is formed on the right.

The arm 1074 is mounted onto the case 1021 through a torque hinge 1073. The arm 1074 is rotatable on the case 1021 in an up/down or left/right direction in a range of a pan angle $\theta 1$ of $\pm 180°$ and a range of a tilt angle $\theta 2$ of $90°$ (a click feeling is generated when tilted at an angle of about $45°$) if it is assumed that the front is $0°$.

A built-in camera 112 which will be described later is disposed in the camera housing 1075 and captures an image of a user or a room. A torque hinge 1075a is formed in the camera housing 1075. The camera housing 1075 is mounted onto the arm 1074 through the torque hinge 1075a. If it is assumed that a state in which the camera housing 1075 forms a straight line with the arm 1074 is $0°$, the camera housing 1075 is rotatable in a range of a tilt angle $\theta 3$ of about $100°$ in the front side of the terminal 10 and about $90°$ in the back side of the terminal 10.

The relay device 30, the management system 50, and the program providing system 90 have the same appearance as a general server or computer, respectively, and thus a description thereof will be omitted.

Figure 5:
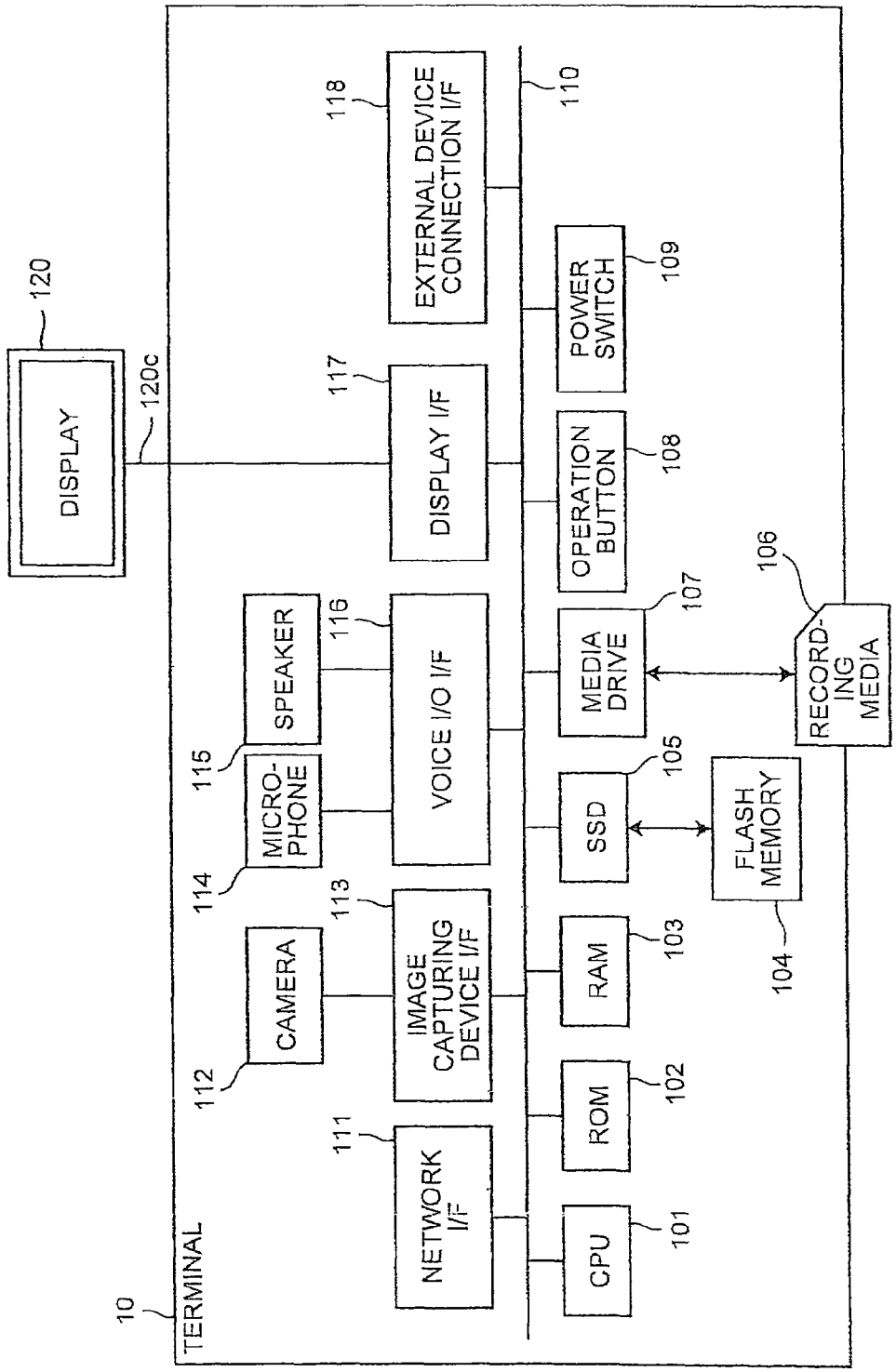
FIG. 5 is a diagram illustrating a hardware configuration of the terminal according to the present exemplary embodiment.

FIG. 5 is a diagram illustrating hardware configuration of the terminal 10 according to the present exemplary embodiment of the present invention. As illustrated in FIG. 5, the terminal 10 includes a central processing unit (CPU) 101 that controls an overall operation of the terminal 10, a read only memory (ROM) 102 that stores a program, used for driving of the CPU 101, such as an initial program loader (IPL), a random access memory (RAM) 103 used as a work area of the CPU 101, a flash memory 104 that stores a variety of data such as the terminal program, the image data, and the voice data, a solid state drive (SSD) 105 that reads or writes a variety of data from or in the flash memory 104 under control of the CPU 101, a media drive 107 that controls reading or writing (storing) of data from or to a recording media 106 such as a flash memory, an operation button 108 operated when selecting a destination of the terminal 10, a power switch 109 for switching ON/OFF of power of the terminal 10, and a network interface (I/F) 111 for performing data transmission via the communication network 2.

The terminal 10 further includes the built-in camera 112 that captures an image of a subject under control of the CPU 101, an image capturing device I/F 113 that controls driving of the camera 112, a built-in microphone 114 that receives a voice, the built-in speaker 115 that outputs a voice, a voice I/O I/F 116 that processes an input and output of a voice signal between the microphone 114 and the speaker 115 under control of the CPU 101, a display I/F 117 that transmits the image data to a display 120 mounted to the outside thereof under control of the CPU 101, and an external device connection I/F 118 that is connected with a variety of external devices, and a bus line 110 such as an address bus or a data bus that electrically connects the above-mentioned components as illustrated in FIG. 5.

The display 120 is a display unit configured with a liquid crystal or an organic EL that displays an image of a subject or an operation icon. The display 120 is connected with the display I/F 117 through a cable 120c. As the cable 120c, a cable for an analog RGB (VGA) signal, a cable for a component video, or a cable for a high-definition multimedia interface (HDMI) or digital video interactive (DVI) signal may be used.

The camera 112 includes a lens and a solid-state image sensing device that digitizes an image (a video) of a subject by converting light into an electrical charge. As the solid state image sensing device, a complementary metal oxide semiconductor (CMOS) or a charge coupled device (CCD) is used.

An external device such as an external camera, an external microphone, and an external speaker may be connected to the external device connection I/F 118 through a universal serial bus (USB). When the external camera is connected, the external camera is driven prior to the built-in camera 112 under control of the CPU 101. Similarly, when the external microphone is connected or when the external speaker is connected, the external microphone or the external speaker is driven prior to the built-in microphone 114 or the built-in speaker 115 under control of the CPU 101.

The recording media 106 is configured to be removal from the terminal 10. A non-volatile memory in which reading or writing of data is performed under control of the CPU 101 is not limited to the flash memory 104, and an electrically erasable and programmable ROM (EEPROM) may be used.

The terminal program is a file having an installable format or an executable format. The terminal program may be distributed in the form recorded on a computer readable recording medium such as the recording medium 106. The terminal program may be stored in the ROM 102 other than the flash memory 104.

Figure 6:
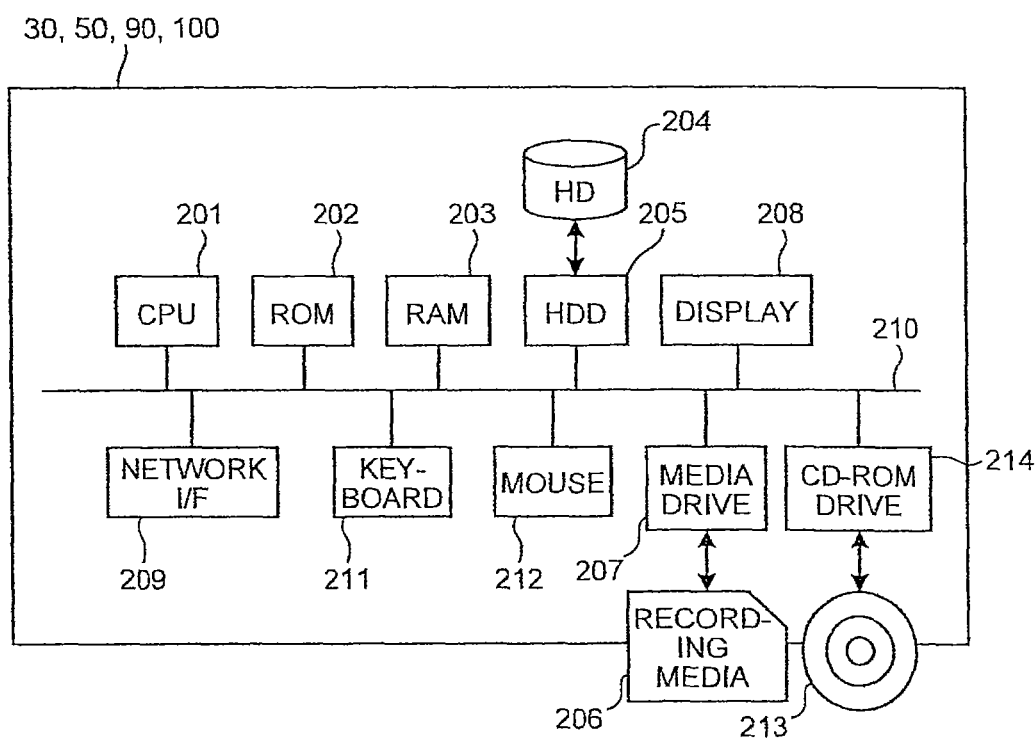
FIG. 6 is a diagram illustrating a hardware configuration of a management system, a relay device, and a program providing system according to the present exemplary embodiment.

FIG. 6 is a hardware configuration diagram of the management system according to the embodiment of the present invention. As shown in FIG. 6, the management system 50 includes: a CPU 201 that controls an overall operation of the management system 50; a ROM 202 that stores a program, used for driving of the CPU 201, such as an IPL; a RAM 203 used as a working area of the CPU 201, the hard disk (HD) 204 that stores a variety of data such as a transmission management program; a hard disk drive (HDD) 205 that controls reading or writing of various data to or from the HD 204 under control of the CPU 201; a media drive 207 that controls reading or writing (storing) of data from or to a recording media 206 such as a flash memory; a display 208 that displays various information such as a cursor, a menu, a window, a character, and an image; a network I/F 209 for performing data transmission via the communication network 2; a keyboard 211 that includes a plurality of keys for inputting a character, a numerical number, and a variety of instructions; a mouse 212 that performs selection or execution of a variety of instructions, selection of a processing target, and movement of a cursor; a compact disc-read only memory (CD-ROM) drive 214 that controls reading or writing of various data from or to a CD-ROM 213 as a removable recording medium; and a bus line 210 such as an address bus or a data bus for electrically connecting the above-mentioned components.

The transmission management program is a file having an installable format or an executable format. The transmission management program may be distributed in the form recorded on a computer readable recording medium such as the recording medium 206 or the CD-ROM 213. The transmission management program may be stored in the ROM 202 other than the HD 204.

The relay device 30 has a similar configuration to the management system 50, and thus a description thereof will not be repeated. However, a relay device program for controlling the relay device 30 is recorded in the HD 204. Even in this case, the relay device program is a file having an installable format or an executable format. The relay device program may be distributed in the form recorded on a computer readable recording medium such as the recording medium 206 or the CD-ROM 213. The relay device program may be stored in the ROM 202 other than the HD 204.

The program providing system 90 and the maintenance system 100 have a similar configuration to the management system 50, and thus a description thereof will not be repeated. However, a program for the program providing system for controlling the program providing system 90 is recorded in the HD 204. Even in this case, the program for the program providing system is a file having an installable format or an executable format, and may be distributed in the form recorded on a computer readable recording medium such as the recording medium 206 or the CD-ROM 213. A program for the program providing system may be stored in the ROM 202 other than the HD 204.

As another example of the removable recording medium, there may be provided a computer readable recording medium such as a compact disc-recordable (CD-R), a digital versatile disk (DVD), and a Blu-ray disc for recording and providing the programs.

A Functional Configuration of the Exemplary Embodiment

Figure 7:
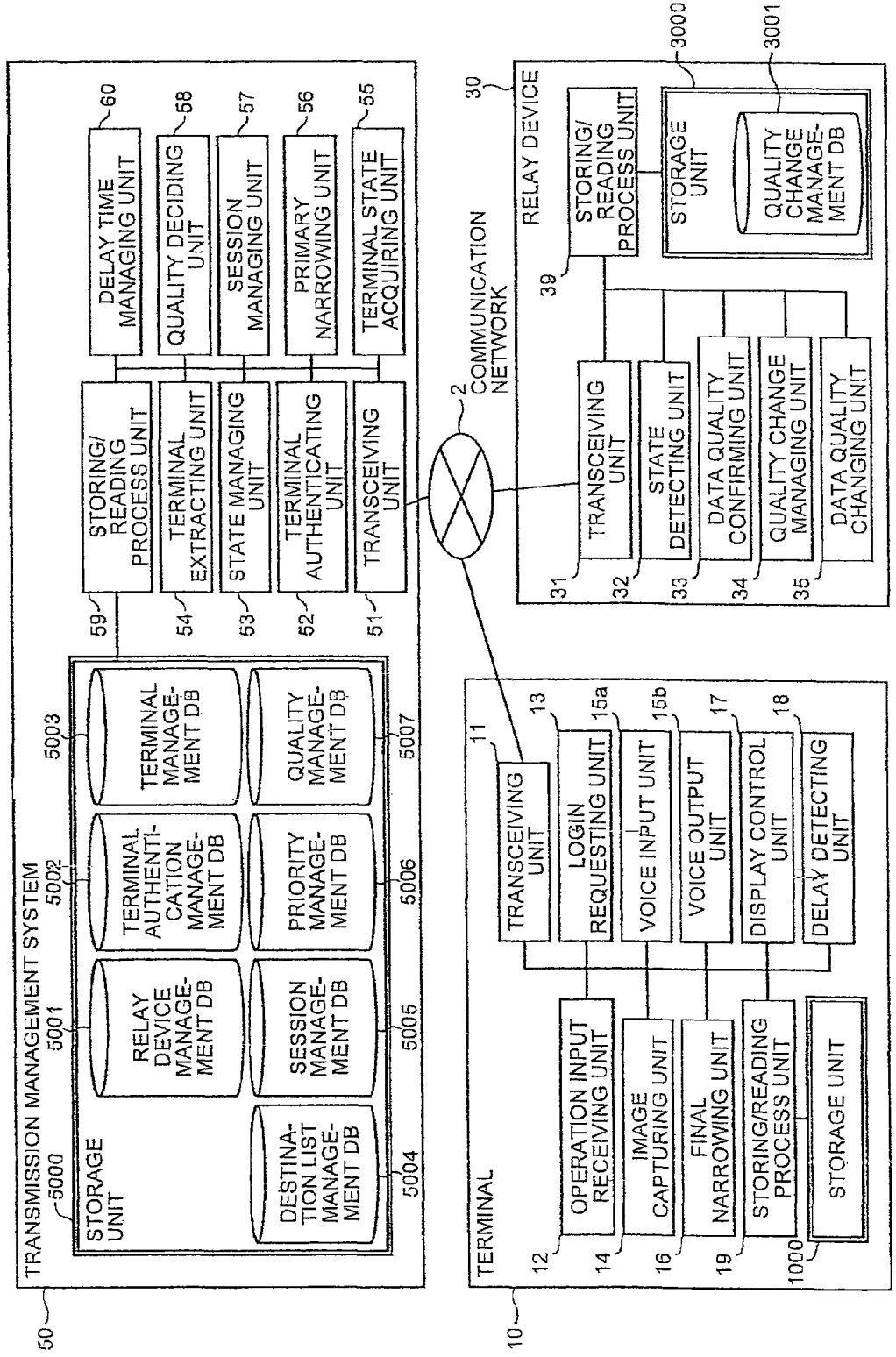
FIG. 7 is a functional block diagram of the terminal, the relay device, and the management system that constitute the transmission system according to the present exemplary embodiment.

Next, a functional configuration of the present exemplary embodiment will be described. FIG. 7 is a functional block diagram of each terminal, the device, and the system that constitute the transmission system 1 according to the present exemplary embodiment. In FIG. 7, the terminal 10, the relay device 30, and the management system 50 are connected to perform communications via the communication network 2. The program providing system 90 illustrated in FIG. 1 has nothing to do directly with video conference communication and thus, an illustration thereof is omitted in FIG. 7.

A Functional Configuration of the Terminal

The terminal 10 includes a transceiving unit 11, an operation input receiving unit 12, a login requesting unit 13, an image capturing unit 14, a voice input unit 15a, a voice output unit 15b, a final narrowing unit 16, a display control unit 17, a delay detecting unit 18, and a storing/reading process unit 19. Each of the components performs a function that is executed or serves as a means that operates such that any one of the components illustrated in FIG. 5 operates in response to a command from the CPU 101 according to the terminal program loaded onto the RAM 103 from the flash memory 104. The terminal 10 further includes a storage unit 1000 constructed by the RAM 103 illustrated in FIG. 5 and the flash memory 104 illustrated in FIG. 5.

Each Functional Configuration of the Terminal

Next, each functional configuration of the terminal 10 will be described in detail with reference to FIGS. 5 and 7. A description of each functional configuration of the terminal 10 will be made below in connection with a relationship with major components for implementing each functional configuration of the terminal among the components illustrated in FIG. 5.

The transceiving unit 11 of the terminal 10 illustrated in FIG. 5 is implemented by a command from the CPU 101 illustrated in FIG. 5 and the network I/F 111 illustrated in FIG. 5 and performs exchange of various data (or information) with another terminal, the device or the system via the communication network 2. Before initiating a call with a desired destination terminal, the transceiving unit 11 initiates reception of each piece of state information representing a state of each terminal as a destination candidate from the management system 50. The state information represents not only an operation state (an on-line or off-line state) of each terminal but also a detailed state such as whether each terminal 10 is in a call enable state, in a busy state, or in a user absence state even when it is in the on-line state. Further, the state information represents not only the operation state of each terminal 10 but also various states such as a state in which the cable 120c is removed from the terminal 10, a state in which a voice is output but an image is not output, or a state (a mute state) in which a voice is not output. Hereinafter, as an example, a case in which the state information represents the operation state will be described.

The operation input receiving unit 12 is implemented by a command from the CPU 101 illustrated in FIG. 5, and the operation button 108 and the power switch 109 that are illustrated in FIG. 5 and receives various inputs from the user. For example, if the user turns on the power switch 109 illustrated in FIG. 5, the operation input receiving unit 12 illustrated in FIG. 7 receives power ON and turns on the power.

The login requesting unit 13 is implemented by a command from the CPU 101 illustrated in FIG. 5. The login requesting unit 13 automatically transmits login request information representing a login request and a present IP address of a request source terminal from the transceiving unit 11 to the management system 50 via the communication network 2 when the power ON is received. If the user switches the power switch 109 from the ON state to the OFF state, after the transceiving unit 11 transmits the state information representing power OFF to the management system 50, the operation input receiving unit 12 completely turns off the power. Thus, the management system 50 side can recognize that the power of the terminal 10 was switched from ON to OFF.

The image capturing unit 14 is implemented by a command from the CPU 101 illustrated in FIG. 5, and the camera 112 and the image capturing device I/F 113 that are illustrated in FIG. 5. The image capturing unit 14 captures an image of a subject and outputs image data obtained by capturing the image.

The voice input unit 15a is implemented by a command from the CPU 101 illustrated in FIG. 5 and the voice I/O I/F 116 illustrated in FIG. 5. The voice input unit 15a receives voice data related to a voice signal obtained by converting a voice of the user through the microphone 114. The voice output unit 15b is implemented by a command from the CPU 101 illustrated in FIG. 5 and the voice I/O I/F 116 illustrated in FIG. 5. The voice output unit 15b outputs a voice signal related to voice data to the speaker, so that a voice is output from the speaker.

The final narrowing unit 16 implements a measuring unit 16a, a calculating unit 16b, and a final selecting unit 16c, which are illustrated in FIG. 8, based on a command from the CPU 101 illustrated in FIG. 5 in order to perform a final narrowing process for finally narrowing the plurality of relay devices 30 down to one relay device 30.

Of these, the measuring unit 16a measures reception date and time in which prior transmission information, which will be described later, is received by the transceiving unit 11 for each piece of the prior transmission information received by the transceiving unit 11. The calculating unit 16b calculates a required time T between transmission and reception of the prior transmission information, for each piece of the prior transmission information in which the reception date and time was measured by the measuring unit 16a, based on a difference between the measured reception time and a transmission time included in the prior transmission information. The final selecting unit 16c finally selects one relay device by selecting the relay device 30 that relayed the prior transmission information having the shortest required time among the required times calculated by the calculating unit 16b.

The display control unit 17 is implemented by a command from the CPU 101 illustrated in FIG. 5 and the display I/F 117 illustrated in FIG. 5. The display control unit 17 performs control for combining received image data having different resolutions as will be described later and transmitting the combined image data to the display 120. The display control unit 17 transmits destination list information received from the management system 50 to the display 120 so that the destination list can be displayed on the display 120.

The delay detecting unit 18 is implemented by a command from the CPU 101 illustrated in FIG. 5. The delay detecting unit 18 detects a delay time (ms) of the image data or voice data transmitted from another terminal 10 through the relay device 30.

The storing/reading process unit 19 is implemented by a command from the CPU 101 illustrated in FIG. 5 and the SSD 105 illustrated in FIG. 5 or implemented by a command from the CPU 101. The storing/reading process unit 19 performs a process of storing various data in the storage unit 1000 or reading various data stored in the storage unit 1000. A terminal identification (ID) for identifying the terminal 10 and a password are stored in the storage unit 1000. Further, the image data and voice data received while performing a call with a destination terminal are stored in the storage unit 1000 in an overwriting manner at each time of reception. At this time, an image is displayed on the display 120 based on the image data that is not overwritten yet, and a voice is output from a speaker 150 based on the voice data that is not overwritten yet.

The terminal ID and a relay device ID which will be described later according to the present exemplary embodiment represent identification information such as a language, a character, a symbol, or various marks used for uniquely identifying each terminal 10 and each relay device 30, respectively. The terminal ID and the relay device ID may include identification information in which at least two of the language, the character, the symbol, and the various marks are combined.

A Functional Configuration of the Relay Device

The relay device 30 includes a transceiving unit 31, a state detecting unit 32, a data quality confirming unit 33, a quality change managing unit 34, a data quality changing unit 35, and a storing/reading process unit 39. Each of the components performs a function that is executed or serves as a means that operates such that any one of the components illustrated in FIG. 6 operates in response to a command from the CPU 201 based on the relay device program loaded onto the RAM 203 from the HD 204. The relay device 30 further includes a storage unit 3000 constructed by the RAM 203 illustrated in FIG. 6 and/or the HD 204 illustrated in FIG. 6.

A Quality Change Management Table

A quality change management database (DB) 3001 configured with a quality change management table illustrated in FIG. 10 is constructed in the storage unit 3000. In the quality change management table, the IP address of the terminal 10 as the relay destination of the image data is managed in association with the image quality of the image data to be relayed to the relay destination by the relay device 30.

Each Functional Configuration of the Relay Device

Next, each functional configuration of the relay device 30 will be described in detail. A description of each functional configuration of the relay device 30 will be made below in connection with a relationship with major components for implementing each functional configuration of the relay device 30 among the components illustrated in FIG. 6.

The transceiving unit 31 of the relay device 30 illustrated in FIG. 7 is implemented by a command from the CPU 201 illustrated in FIG. 6 and the network I/F 209 illustrated in FIG. 6 and performs exchange of various data (or information) with another terminal, the device or the system via the communication network 2.

The state detecting unit 32 is implemented by a command from the CPU 201 illustrated in FIG. 6 and detects the operation state of the relay device 30 having the state detecting unit 32. The operation state may include a "one-line" state, an "off-line" state, a "busy" state, and a "temporary halt" state.

The data quality confirming unit 33 is implemented by a command from the CPU 201 illustrated in FIG. 6. The data quality confirming unit 33 confirms the image quality of the image data to be relayed by retrieving the quality change management DB 3001 (see FIG. 10) by using the IP address of the destination terminal as a retrieval key and extracting the image quality of the corresponding image data to be relayed.

The quality change managing unit 34 is implemented by a command from the CPU 201 illustrated in FIG. 6 and changes the content of the quality change management DB 3001 based on quality information, which will be described later, transmitted from the management system 50. For example, while the video conference is being held by transmitting and receiving the high-quality image data between the request source terminal (the terminal 10aa) having "01aa" as the terminal ID and the destination terminal (the terminal 10db) having "01db" as the terminal ID, if a delay occurs when the destination terminal (the terminal 10db) receives the image data because the request source terminal (the terminal 10bb) and the destination terminal (the terminal 10ca) that perform another video conference start the video conference via the communication network 2, the relay device 30 lowers the image quality of the image data that has been relayed so far from the high image quality to the intermediate image quality. In this case, the content of the quality change management DB 3001 is changed, based on the quality information representing the intermediate image quality, to lower the image quality of the image data to be relayed by the relay device 30 from the high image quality to the intermediate image quality.

The data quality changing unit 35 is implemented by a command from the CPU 201 illustrated in FIG. 6 and changes the image quality of the image data transmitted from the transmission source terminal based on the changed content of the quality change management DB 3001.

The storing/reading process unit 39 is implemented by a command from the CPU 201 illustrated in FIG. 6 and the HDD 205 illustrated in FIG. 6. The storing/reading process unit 39 performs a process of storing various data in the storage unit 3000 or reading various data stored in the storage unit 3000.

A Functional Configuration of the Management System

The management system 50 includes a transceiving unit 51, a terminal authenticating unit 52, a state managing unit 53, a terminal extracting unit 54, a terminal state acquiring unit 55, a primary narrowing unit 56, a session managing unit 57, a quality deciding unit 58, a storing/reading process unit 59, and a delay time managing unit 60. Each of the components performs a function that is executed or serves as a means that operates such that any one of the components illustrated in FIG. 6 operates in response to a command from the CPU 201 based on the management system program loaded onto the RAM 203 from the HD 204. The management system 50 further includes a storage unit 5000 constructed by the HD 204 illustrated in FIG. 6.

A Relay Device Management Table

A relay device management DB 5001 configured with a relay device management table illustrated in FIG. 11 is constructed in the storage unit 5000. In the relay device management table, the operation state of each relay device 30, the reception date and time in which the state information representing the operation state is received by the management system 50, the IP address of the relay device 30, and a maximum data transmission rate Mbps in the relay device 30 are managed in association with the relay device ID of each relay device 30. For example, the relay device management table illustrated in FIG. 11 represents that the operation state of the relay device 30a having "111a" as the relay device ID is "on-line," the date and time in which the state information was received by the management system 50 is "13:00, November 10, 2009," the IP address of the relay device 30a is "1.2.1.2," and the maximum data transmission rate in the relay device 30a is 100 Mbps.

A Terminal Authentication Management Table

Further, a terminal authentication management DB 5002 configured with a terminal authentication management table illustrated in FIG. 12 is constructed in the storage unit 5000. In the terminal authentication management table, a password is managed in association with a terminal ID for each of the terminals 10 managed by the management system 50. For example, the terminal authentication management table illustrated in FIG. 2 represents that the terminal ID of the terminal 10aa is "01aa," and the password is "aaaa."

A Terminal Management Table

A terminal management DB 5003 configured with a terminal management table illustrated in FIG. 13 is constructed in the storage unit 5000. In the terminal management table, a destination name in which each terminal 10 is a destination, the operation state of each terminal 10, the reception date and time in which login request information which will be described later is received by the management system 50, and the IP address of the terminal 10 are managed in association with the terminal ID of each of the terminals 10. For example, the terminal management table illustrated in FIG. 13 represents that the terminal name of the terminal 10aa having "01aa" as the terminal ID is an "AA terminal of a Tokyo office in Japan," the operation state is "on-line (call enable)," the date and time in which the login request information was received by the management system 50 is "13:40, November 10, 2009," and the IP address of the terminal 10aa is "1.2.1.3."

A Destination List Management Table

Further, a destination list management DB 5004 configured with a destination list management table illustrated in FIG. 14 is constructed in the storage unit 5000. In the destination list management table, the terminal IDs of all the destination terminals registered as the candidate of the destination terminal are managed in association with the terminal ID of the request source terminal that requests the start of a call in the video conference. For example, the destination list management table illustrated in FIG. 14 represents that the candidate of the destination terminal (the terminal 10db) to which the request source terminal (the terminal 10aa) having "01aa" as the terminal ID can requests the start of a call in the video conference includes the terminal 10ab having "01ab" as the terminal ID, the terminal 10ba having "01ba" as the terminal ID, the terminal 10bb having "01bb" as the terminal ID, etc. The candidate of the destination terminal is updated in a manner that the candidate of the destination terminal is added or deleted by an addition or deletion request transmitted from an arbitrary request source terminal to the management system 50.

A Session Management Table

Further, a session management DB 5005 configured with a session management table illustrated in FIG. 15 is constructed in the storage unit 5000. In the session management table, the relay device ID of the relay device 30 used for a relay of the image data and the voice data, the terminal ID of the request source terminal, the terminal ID of the destination terminal, the reception delay time ms occurred when the image data is received by the destination terminal, and the reception date and time in which the delay information representing the delay time is transmitted from the destination terminal and received by the management system 50 are managed in association with a selection session ID used for execution of a session for selecting the relay device 30. For example, the session management table illustrated in FIG. 15 represents that the relay device 30a (the relay device ID "111a") selected through the session executed by using the selection session ID "se1" relays the image data and the voice data between the request source terminal (the terminal 10aa) having "01aa" as the terminal ID and the destination terminal (the terminal 10db) having "01db" as the terminal ID, and the delay time of the image data at a point in time of "14:00, November 10, 2009" in the destination terminal (the terminal 10db) is 200 ms. Further, when the video conference is held between the two terminals 10, the reception date and time of the delay information may be managed based on the delay information transmitted from the request source terminal other than the destination terminal. Further, when the video conference is held among the three terminals 10, the reception date and time of the delay information may be managed based on the delay information transmitted from the terminal 10 at the receiving side of the image data and the voice data.

An Address Priority Management Table

Further, a priority management DB 5006 configured with an address priority management table illustrated in FIG. 16 is constructed in the storage unit 5000. In the address priority management table, whether or not the dot addresses in an arbitrary terminal 10 is the same as or different from the dot address in an arbitrary relay device 30 is managed in association with an address priority such that the more the number of "same" in a four-set dot address part of a typical IP address in the IPv4 is, the higher the point of the address priority is. The "same" means that the dot address parts are the same as each other, and the "different" means that the dot address parts are different from each other. For example, in the address priority management table illustrated in FIG. 16, in the case of the IP address in which three values are same from a high-order dot address to a low-order dot address, the point of the address priority is "5." In the case of the IP address in which two values are same from the high-order dot address to the low-order dot address, the point of the address priority is "3." In this case, whether or not the value of the least significant dot address is same has nothing to do with the priority. In the case of the IP address in which the value of the most significant dot address is same, and the second value from the high order is different, the point of the address priority is "1." In this case, whether or not the third value from the high order and the value of the least significant dot address are same has nothing to do with the priority. In the case of the IP address in which the value of the most significant dot address is different, the point of the address priority is "0." In this case, whether or not the second value and the third value from the high order and the value of the least significant dot address are same has nothing to do with the priority.

A Transmission Rate Priority Management Table

Further, a transmission rate priority management table illustrated in FIG. 17 is included in the priority management DB 5006 constructed in the storage unit 5000. In the transmission rate priority management table, a maximum data transmission rate and a transmission rate priority are managed in association with each other such that the higher the value of the maximum data transmission rate Mbps is, the higher the point of the transmission rate priority is. For example, in the transmission rate priority management table illustrated in FIG. 17, when the maximum data transmission rate in the relay device 30 is 1000 Mbps, the point of the transmission rate priority is "5." When the maximum data transmission rate in the relay device 30 is equal to or more than 100 Mbps and less than 1000 Mbps, the point of the transmission rate priority is "3." When the maximum data transmission rate in the relay device 30 is equal to or more than 10 Mbps and less than 100 Mbps, the point of the transmission rate priority is "1." When the maximum data transmission rate in the relay device 30 is less than 10 Mbps, the point of the transmission rate priority is "0."

A Quality Management Table

Further, a quality management DB 5007 configured with a quality management table illustrated in FIG. 18 is constructed in the storage unit 5000. In the quality management table, the delay time of the image data and the image quality of the image data (the quality of the image) are managed in association with each other such that the longer the delay time ms of the image data in the request source terminal or the destination terminal is, the lower the image quality (the quality of the image) of the image data to be relayed by the relay device 30 is.

Each Functional Configuration of the Management System

Next, each functional configuration of the management system 50 will be described in detail. Hereinafter, a description of each functional configuration of the management system will be made in connection with a relationship with major components for implementing each functional configuration of the management system 50 among the components illustrated in FIG. 6.

The transceiving unit 51 is implemented by a command from the CPU 201 illustrated in FIG. 6 and the network I/F 209 illustrated in FIG. 6 and performs exchange of various data (or information) with another terminal, the device or the system via the communication network 2.

The terminal authenticating unit 52 is implemented by a command from the CPU 201 illustrated in FIG. 6. The terminal authenticating unit 52 performs terminal authentication by retrieving the terminal authentication management DB 5002 of the storage unit 5000 by using the terminal ID and the password included in the login request information received through the transceiving unit 51 as a retrieval key and determining whether or not the same terminal ID and password are managed in the terminal authentication management DB 5002.

The state managing unit 53 is implemented by a command from the CPU 201 illustrated in FIG. 6. The state managing unit 53 stores and manages the terminal ID of the request source terminal, the operation state of the request source terminal, the reception date and time in which the login request information is received by the management system 50, and the IP address of the request source terminal in the terminal management DB 5003 (see FIG. 13) in association with each other in order to manage the operation state of the request source terminal that requested the login. When the user switches the state of the power switch 109 of the terminal 10 from ON to OFF, the state managing unit 53 changes the operation state of the terminal management DB 5003 (see FIG. 13) representing "on line" to "off line" based on the state information representing power OFF transmitted from the terminal 10.

The terminal extracting unit 54 is implemented by a command from the CPU 201 illustrated in FIG. 6. The terminal extracting unit 54 retrieves the destination list management DB 5004 (see FIG. 14) by using the terminal ID of the request source terminal that requested the login as a key and extracts the terminal ID by reading the terminal ID of the candidate of the destination terminal that can perform a call with the request source terminal. Further, the terminal extracting unit 54 retrieves the destination list management DB 5004 (see FIG. 14) by using the terminal ID of the request source terminal that requested the login as a key and extracts the terminal ID of another request source terminal that registered the terminal ID of the request source terminal as the candidate of the destination terminal.

The terminal state acquiring unit 55 is implemented by a command from the CPU 201 illustrated in FIG. 6. The terminal state acquiring unit 55 retrieves the terminal management DB 5003 (see FIG. 13) by using the terminal ID of the candidate of the destination terminal extracted by the terminal extracting unit 54 as a retrieval key and reads the operation state for each of the terminal IDs extracted by the terminal extracting unit 54. Thus, the terminal state acquiring unit 55 can acquire the operation state of the candidate of the destination terminal that can perform a call with the request source terminal that requested the login. Further, the terminal state acquiring unit 55 retrieves the terminal management DB 5003 by using the terminal ID extracted by the terminal extracting unit 54 as the retrieval key and acquires the operation state of the request source terminal that requested the login.

The primary narrowing unit 56 is implemented by a command from the CPU 201 illustrated in FIG. 6. The primary narrowing unit 56 performs a primary narrowing process before a final narrowing process in order to support the final narrowing process for finally narrowing the plurality of relay devices 30 down to one relay device 30. To this end, the primary narrowing unit 56 implements a selection session ID generating unit 56a, a terminal IP address extracting unit 56b, a primary selecting unit 56c, and a priority deciding unit 56d as illustrated in FIG. 9, based on a command from the CPU 201 illustrated in FIG. 6.

Of these, the selection session ID generating unit 56a generates a selection session ID used to execute the session for selecting the relay device 30. The terminal IP address extracting unit 56b extracts the IP address of each corresponding terminal 10 by retrieving the terminal management DB 5003 (see FIG. 13) based on the terminal ID of the request source terminal and the terminal ID of the destination terminal that are included in the start request information transmitted from the request source terminal. The primary selecting unit 56c performs selection of the relay device 30 by selecting the relay device ID of the relay device 30 whose operation state is indicated as "on line" from among the relay devices 30 managed by the relay device management DB 5001 (see FIG. 11).

Further, the primary selecting unit 56c investigates whether each of the dot addresses of the IP address of the selected relay device 30 is the same as or different from each dot address in each IP address of the request source terminal and the destination terminal by retrieving the relay device management DB 5001 (see FIG. 11) based on the IP address of the request source terminal and the IP address of the destination terminal extracted by the terminal IP address extracting unit 56b. Further, the primary selecting unit 56c performs selection of the relay device 30 by selecting the two high-order relay devices 30 that are high in integrated point in which the point of the address priority that is higher on the terminal 10 and the point of the transmission rate priority for each relay device are integrated. Further, in the present exemplary embodiment, the two high-order relay devices 30 that are high in point are selected, but the present invention is not limited thereto. To the extent that it is possible to further narrow even one relay device 30, three or more high-order relay devices 30 that are high in point may be selected.

The priority deciding unit 56d decides the point of the address priority for each of the relay device 30 investigated by the primary selecting unit 56c with reference to the priority management DB 5006 (see FIG. 16). Further, the priority deciding unit 56d decides the point of the transmission rate priority for every relay device 30 narrowed down by the primary narrowing process performed by the primary selecting unit 56c by retrieving the priority management DB 5006 (see FIG. 17) based on the maximum data transmission rate of each of the relay device 30 managed in the relay device management DB 5001 (see FIG. 11).

Subsequently, the session managing unit 57 is implemented by a command from the CPU 201 illustrated in FIG. 6. The session managing unit 57 stores and manages the selection session ID generated by the selection session ID generating unit 56a, the terminal ID of the request source terminal, and the terminal ID of the destination terminal in the session management DB 5005 (see FIG. 15) in association with each other. The session managing unit 57 stores and manages the relay device ID of one relay device 30 finally selected by the final selecting unit 16c of the terminal 10 for every selection session ID in the session management DB 5005 (see FIG. 15).

The quality deciding unit 58 decides the image quality of the image data to be relayed in the relay device 30 by retrieving the quality management DB 5007 (see FIG. 18) by using the delay time as the retrieval key and extracting the corresponding image quality of the image data.

The storing/reading process unit 59 is implemented by a command from the CPU 201 illustrated in FIG. 6 and the HDD 205 illustrated in FIG. 6. The storing/reading process unit 59 performs a process of storing various data in the storage unit 5000 and reading various data stored in the storage unit 5000.

The delay time managing unit 60 is implemented by a command from the CPU 201 illustrated in FIG. 6. The delay time managing unit 60 extracts the corresponding terminal ID by retrieving the terminal management DB 5003 (see FIG. 13) by using the IP address of the destination terminal as the retrieval key. Further, the delay time managing unit 60 stores and manages the delay time represented by the delay information in a delay time field part in a record including the extracted terminal ID in the session management table of the session management DB 5005 (see FIG. 15).

A Process or an Operation of the Embodiment

Figure 20:
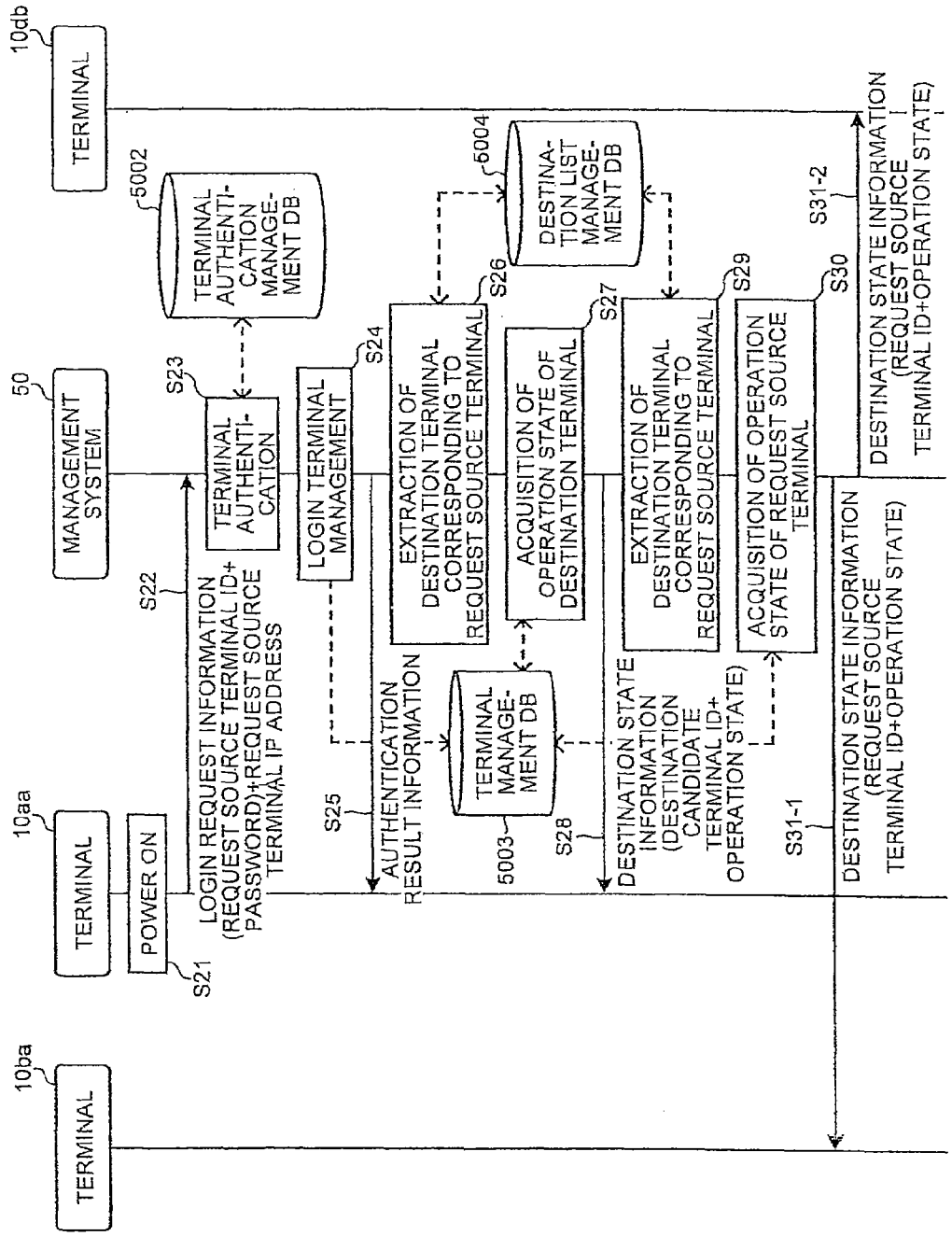
FIG. 20 is a sequence diagram illustrating a process of a preparation step of starting a remote communication between the terminals.
Figure 21:
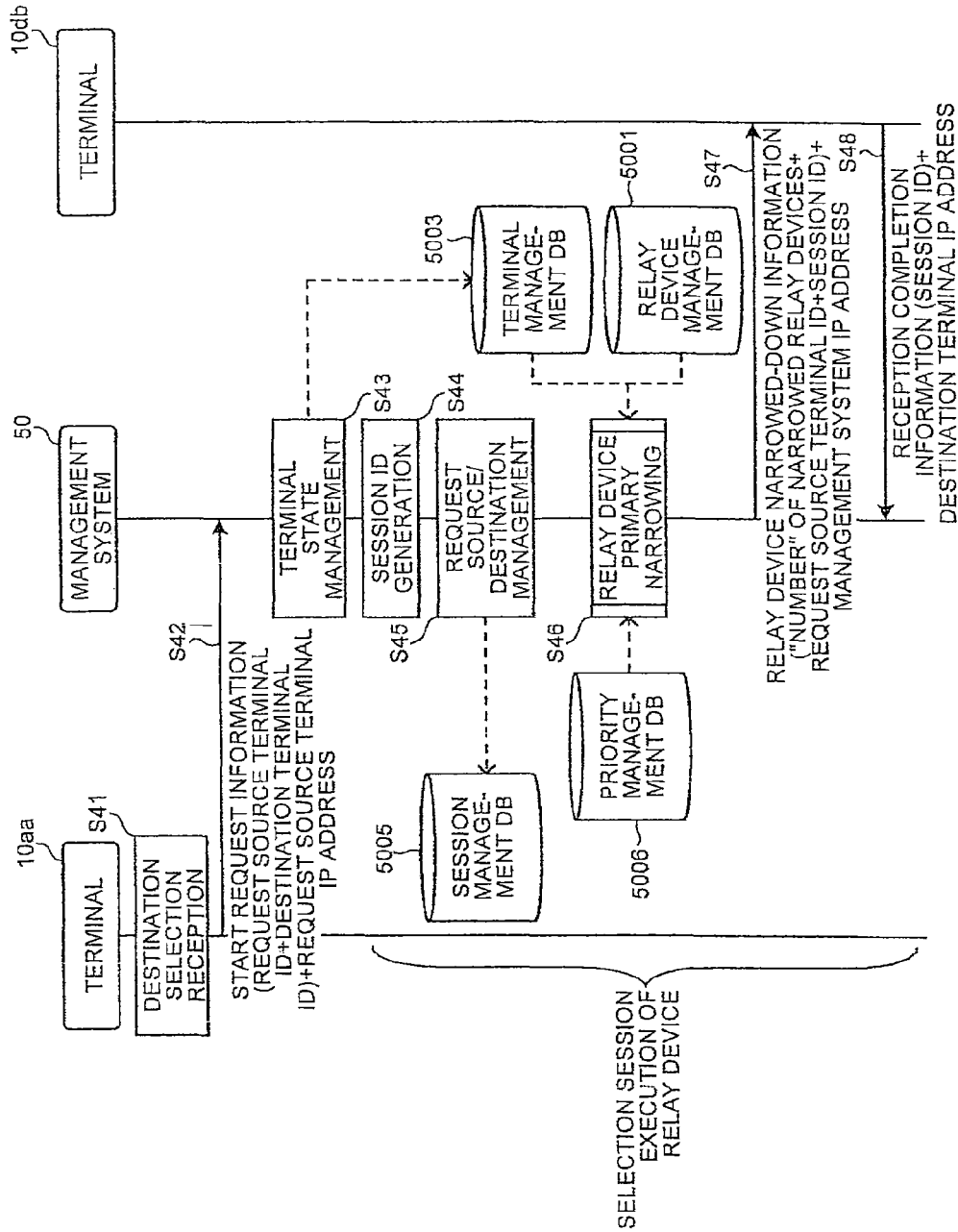
FIG. 21 is a sequence diagram illustrating a process of narrowing down the relay devices.
Figure 22:
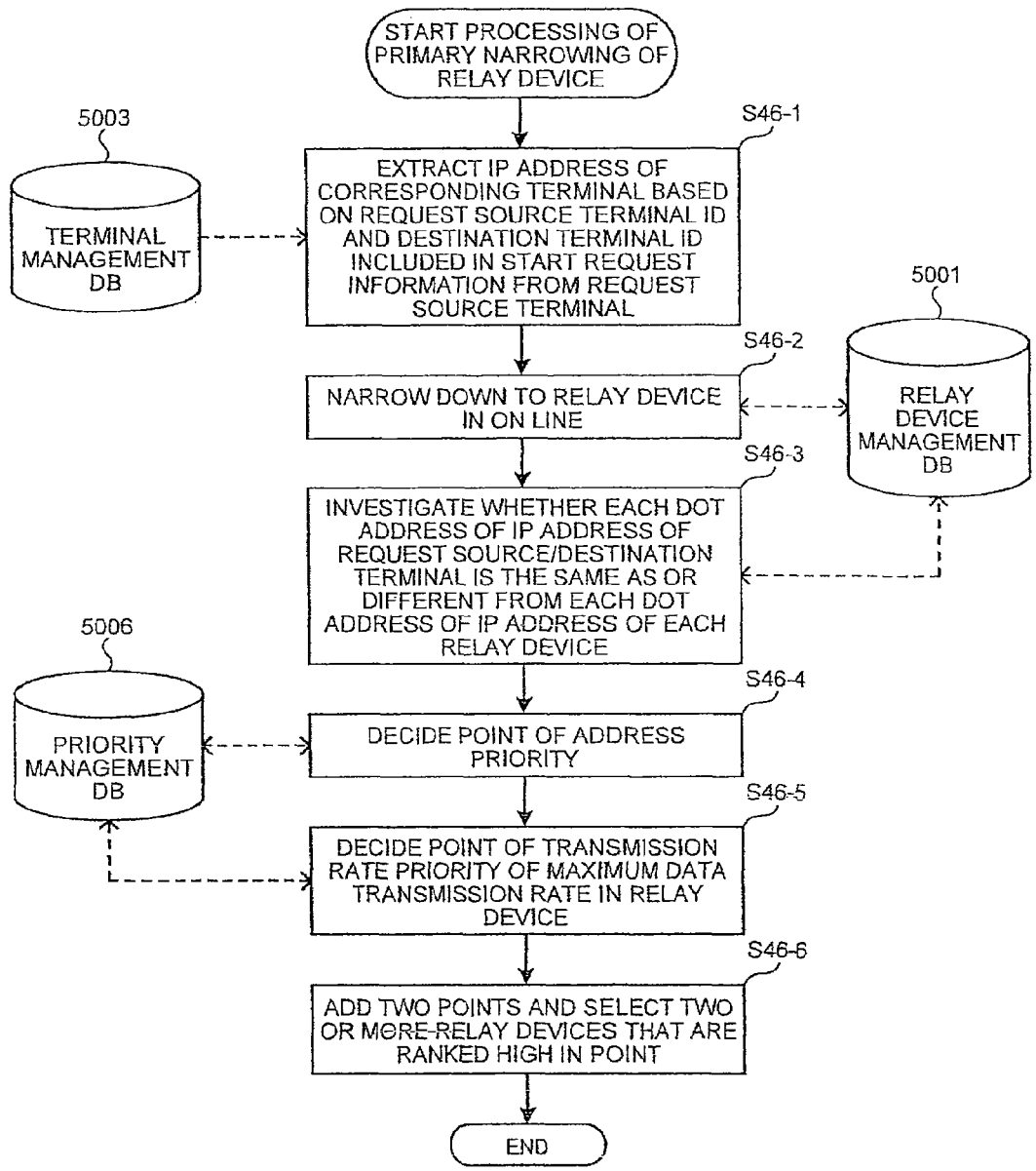
FIG. 22 is a flowchart illustrating a process of narrowing down the relay devices.
Figure 24:
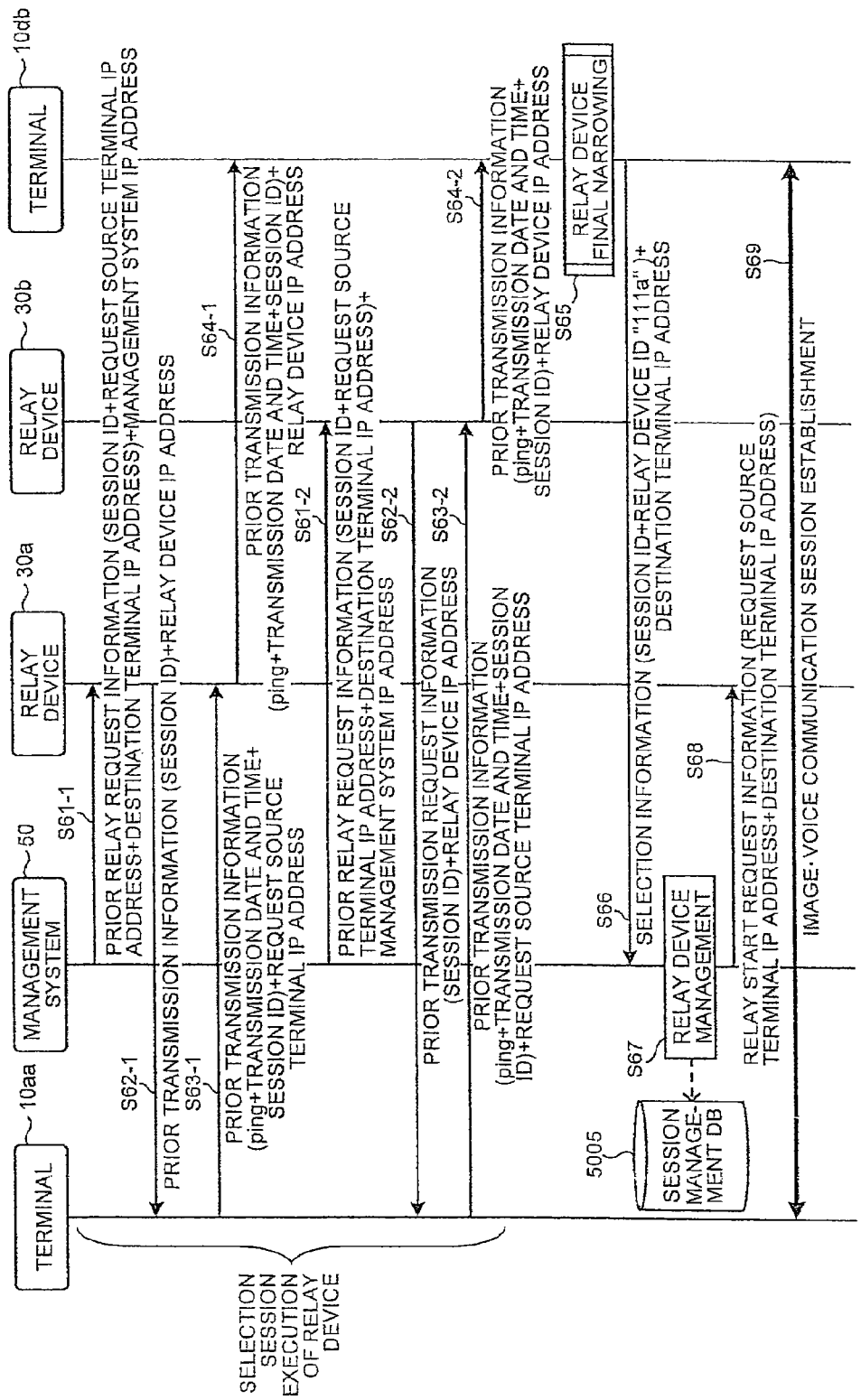
FIG. 24 is a sequence diagram illustrating a process of selecting a relay device at a transmission terminal according to the first exemplary embodiment of the present invention.
Figure 25:
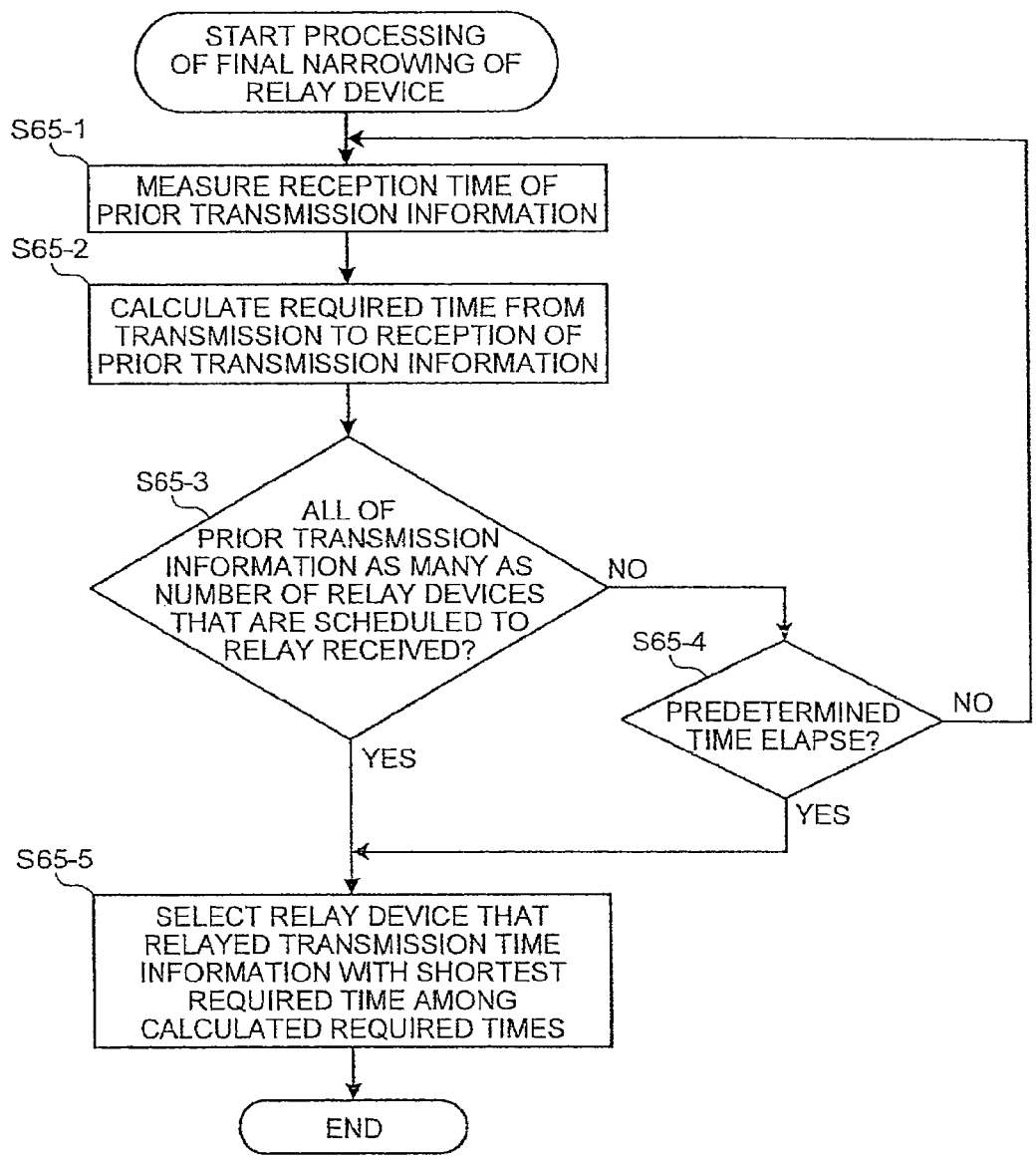
FIG. 25 is a flowchart illustrating a process of selecting a relay device at a transmission terminal.

Next, a process method in the transmission system 1 according to the embodiment will be described with reference to FIGS. 19 to 26. FIG. 19 is a sequence diagram illustrating a process of managing the state information representing the state of each relay device 30 transmitted from each relay device 30 to the management system 50. FIG. 20 is a sequence diagram illustrating a process of a preparation step of starting a call between the plurality of terminals 10. FIG. 21 is a sequence diagram illustrating a process of narrowing the relay device 30. FIG. 22 is a flowchart illustrating a process of narrowing the relay device 30. FIG. 23 is a diagram illustrating a point calculation state when performing a process of narrowing the relay device 30. FIG. 24 is a sequence diagram illustrating a process of selecting the relay device 30 at the terminal 10. FIG. 25 is a flowchart illustrating a process of selecting the relay device 30 at the terminal. FIG. 26 is a sequence diagram illustrating a process of transmitting and receiving image data and voice data between the terminals.

A process of managing the state information representing the state of each relay device 30 transmitted from each relay device 30 to the management system 50 will be first described with reference to FIG. 19. First, in each relay device 30, the state detecting unit 32 illustrated in FIG. 7 periodically detects the operation state of the relay device 30 that is its own device (step S1-1 to step S1-4). In order for the management system 50 side to manage the operation of each relay device 30 in real time, the transceiving unit 31 of each relay device 30 periodically transmits each piece of state information to the management system 50 through the communication network 2 (step S2-1 to step S2-4). Each piece of the state information includes the relay device ID of each relay device 30 and the operation state detected by the state detecting unit 32 of the relay device 30 related to each relay device ID. Further, in the present exemplary embodiment, described is the case in which the relay devices 30a, 30b, and 30d normally operate and are in the "on line" state, whereas the relay device 30c normally operates but is in the "off line" state because a failure occurs in the program for executing a relay operation of the relay device 30c.

Next, in the management system 50, the transceiving unit 51 receives each piece of state information transmitted from each relay device 30, and the storing/reading process unit 59 stores and manages the state information in the relay device management DB 5001 (see FIG. 11) of the storage unit 5000 for every relay device ID (step S3-1 to step S3-4). Thus, any one operation state of "on line," "off line," or "broken" is stored and managed in the relay device management table illustrated in FIG. 11 for every relay device ID. Further, at this time, the reception date and time in which the state information is received by the management system 50 is stored and managed for every relay device ID. Further, when the state information is not transmitted from the relay device 30, the field part of the operation state and the field part of the reception date and time in each record of the relay device management table illustrated in FIG. 11 become empty or represent the operation state and the reception date and time that were received at the time of immediately previous reception.

Next, a transmission and reception process of each piece of management information at a preparation step before starting a call between the terminal 10aa and the terminal 10db will be described with reference to FIG. 20. In FIG. 20, a variety of management information is transmitted and received through the management information session sei illustrated in FIG. 2.

First, when the user switches the power switch 109 illustrated in FIG. 5 to ON, the operation input receiving unit 12 illustrated in FIG. 7 receives power ON, and turns on the power (step S21). The login requesting unit 13 automatically transmits the login request information representing the login request to the management system 50 from the transceiving unit 11 through the communication network 2 upon reception of power ON (step S22). The login request information includes the terminal ID for identifying the terminal 10*aa* that is its own terminal as the request source and the password. The terminal ID and the password are data that is read from the storage unit 1000 by the storing/reading process unit 19 and transmitted to the transceiving unit 11. When the login request information is transmitted to the management system 50 from the terminal 10*aa*, the management system 50 as the receiving side can recognize the IP address of the terminal 10*ab* as the transmitting side.

Next, the terminal authenticating unit 52 of the management system 50 retrieves the terminal authentication management DB 5002 (see FIG. 12) of the storage unit 5000 using the terminal ID and the password included in the login request information received through the transceiving unit 51 as the retrieval key and determines whether or not the same terminal ID and password are managed in the terminal authentication management DB 5002 to perform terminal authentication (step S23). If the terminal authenticating unit 52 determines that the login request is transmitted from the terminal 10 having the authorized permissions since the same terminal ID and password are managed, the state managing unit 53 stores the terminal ID and the operation state of the terminal 10*aa*, the reception date and time in which the login request information is received, and the IP address of the terminal 10*aa* in the terminal management DB 5003 (see FIG. 13) in association with each other (step S24). Thus, the terminal management table illustrated in FIG. 13 manages the operation state "on line," the reception date and time "2009.11.10. 13:40," and the IP address "1.2.1.3" of the terminal 10*aa* in association with the terminal ID "01aa."

The transceiving unit 51 of the management system 50 transmits authentication result information representing the authentication result obtained by the terminal authenticating unit 52 to the request source terminal (the terminal 10*aa*) that requested the login via the communication network 2 (step S25). In the present exemplary embodiment, the case in which the terminal authenticating unit 52 determines that the terminal has the authorized permissions will be continuously described below.

The terminal extracting unit 54 of the management system 50 retrieves the destination list management DB 5004 (see FIG. 14) using the terminal ID "01aa" of the request source terminal (the terminal 10*aa*) that requested the login as the retrieval key, and reads and extracts the terminal ID of the candidate of the destination terminal that can perform communications with the request source terminal (the terminal 10*aa*) (step S26). Here, the terminal IDs ("01ab," "01ba," and "01db") of the terminals (the terminals 10*ab*, 10*ba*, and 10*db*) corresponding to the terminal ID "01aa" of the request source terminal (the terminal 10*aa*) are extracted.

Next, the terminal state acquiring unit 55 retrieves the terminal management DB 5003 (see FIG. 13) by using the terminal IDs ("01ab," "01ba," and "01db") of the candidate of the destination terminal extracted by the terminal extracting unit 54 as the retrieval key and acquires the operation states of the terminals 10*ab*, 10*ba*, and 10*db* by reading the operation states ("off line," "on line," and "on line") of the terminal IDs extracted by the terminal extracting unit 54 (step S27).

Next, the transceiving unit 51 transmits the destination state information including the terminal IDs ("01ab," "01ba," and "01db") as the retrieval key used in step S27 and the operation states ("off line," "on line," and "on line") of the destination terminals (the terminals 10*ab*, 10*ba*, and 10*db*) respectively corresponding thereto to the request source terminal (the terminal 10*aa*) via the communication network 2 (step S28). Thus, the request source terminal (the terminal 10*aa*) can recognize the present operation states ("off line," "on line," and "on line") of the terminals 10*ab*, 10*ba*, and 10*db* that are the candidates of the destination terminal that can communicate with the request source terminal (the terminal 10*aa*).

Further, the terminal extracting unit 54 of the management system 50 retrieves the destination list management DB 5004 (see FIG. 14) by using the terminal ID "01aa" of the request source terminal (the terminal 10*aa*) that requested the login as the retrieval key and extracts the terminal ID of another request source terminal that registered the terminal ID "01aa" of the request source terminal (the terminal 10*aa*) as the candidate of the destination terminal (step S29). In the destination list management table illustrated in FIG. 14, the extracted terminal IDs of another request source terminal are "01ab," "01ba," and "01db."

Next, the terminal state acquiring unit 55 of the management system 50 retrieves the terminal management DB 5003 (see FIG. 13) by using the terminal ID "01aa" of the request source terminal (the terminal 10*aa*) that requested the login as the retrieval key and acquires the operation state of the request source terminal (the terminal 10*aa*) that requested the login (step S30).

The transceiving unit 51 transmits the destination state information including the terminal ID "01aa" of the request source terminal (the terminal 10*aa*) and the operation state "on line" acquired in step S30 to the terminals "10*ba*" and "10*db*" whose operation states are set to "on line" in the terminal management DB 5003 (see FIG. 13) among the terminals "10*ab*," "10*ba*," and "10*db*" respectively corresponding to the terminal IDs "01ab," "01ba," and "01db" extracted in step S29 (step S31-1 and step S31-2). Further, when the transceiving unit 51 transmits the destination state information to the terminals 10*ba* and 10*db*, the IP address of the terminal managed in the terminal management table illustrated in FIG. 13 is referred based on the terminal IDs "01ba" and "01db." Thus, the terminal ID "01aa" of the request source terminal (the terminal 10*aa*) that requested the login and the operation state "on line" can be transmitted to each of the destination terminals (the terminals 10*db* and 10*ba*) that can perform communications with the request source terminal (the terminal 10*aa*) that requested the login as the destination.

Meanwhile, even in another terminal 10, if the user switches the power switch 109 illustrated in FIG. 6 to ON similar to step S21, the operation input receiving unit 12 illustrated in FIG. 7 receives power ON and performs a process similar to step S22 to step S31-1 and step S31-2, and thus a description thereof will not be repeated.

Subsequently, a process of narrowing the relay device 30 will be described with reference to FIG. 21. In FIG. 21, a variety of management information is transmitted and received through the management information session sei illustrated in FIG. 21. Further, in the present exemplary embodiment, the request source terminal (the terminal 10*aa*) can communicate with at least one of the terminals 10*ba* and 10*db* whose operation states in the state information of the terminal received in step S32 are "on line" among the terminals 10 as the destination candidate. Therefore, the case in which the user of the request source terminal (the terminal 10*aa*) starts a call with the destination terminal (the terminal 10*db*) will be described below.

First, if the user presses the operation button 108 illustrated in FIG. 5 to select the terminal 10*db*, the operation input receiving unit 12 illustrated in FIG. 17 receives a request for starting a call with the destination terminal (the terminal 10*db*) (step S41). The transceiving unit 11 of the request source terminal (the terminal 10*aa*) transmits the start request information, which includes the terminal ID "01aa" of the terminal 10*aa* and the terminal ID "01db" of the destination terminal (the terminal 10*db*) and represents a request for starting a call, to the management system 50 (step S42). Thus, the transceiving unit 51 of the management system 50 receives the start request information and also can recognize the IP address "1.2.1.3" of the request source terminal (the terminal 10*aa*) that is the transmission source.

The state managing unit 53 changes the field parts of the operation states of the records respectively including the terminal ID "01aa" and the terminal ID "01db" in the terminal management table of the terminal management DB 5003 (see FIG. 13) into "busy", based on the terminal ID "01aa" of the request source terminal (the terminal 10*aa*) and the terminal ID "01db" of the destination terminal (the terminal 10*db*) included in the start request information (step S43). In this state, the request source terminal (the terminal 10*aa*) and the destination terminal (the terminal 10*db*) do not start a call but are in the busy state. Thus, if another terminal 10 attempts to make a call with the request source terminal (the terminal 10*aa*) or the destination terminal (the terminal 10*db*), a notification sound or display representing the busy state is output.

Next, a process of executing a session for selecting the relay device 30 will be described. First, the selection session ID generating unit 56*a* illustrated in FIG. 9 generates the selection session ID used to execute the session for selecting the relay device 30 (step S44). The session managing unit 57 stores and manages the selection session "se1" generated in step S44, the terminal ID "01aa" of the request source terminal (the terminal 10*aa*), and the terminal ID "01db" of the destination terminal (the terminal 10*db*) in the session management DB 5005 (see FIG. 15) of the storage unit 5000 in association with each other (step S45).

Next, the primary narrowing unit 56 of the management system 50 illustrated in FIG. 7 performs primary narrowing of the relay device 30 for relaying a call with the request source terminal (the terminal 10*aa*) and the destination terminal (the terminal 10*db*) based on the relay device management DB 5001, the terminal management DB 5003, and the priority management DB 5006 (step S46).

The process in step S46 will be described in further detail with reference to FIGS. 9 and 22. First, the terminal IP address extracting unit 56*b* illustrated in FIG. 9 retrieves the terminal management DB 5003 (see FIG. 13) based on the terminal ID "01aa" of the request source terminal 10*aa* and the terminal ID "01db" of the destination terminal 10*db* included in the start communication information transmitted from the request source terminal (the terminal 10*aa*) and extracts the IP addresses "1.2.1.3" and "1.3.2.4" of the corresponding terminals 10*aa* and 10*db* (step S46-1).

Next, the primary selecting unit 56*c* selects the relay device IDs 111a, 111b, and 111d of the relay devices 30*a*, 30*b*, and 30*d* whose operation states are "on line" among the relay devices 30 managed in the relay device management DB 5001 (see FIG. 11) (step S46-2). Further, the primary selecting unit 56*c* retrieves the relay device management DB 5001 (see FIG. 11) based on the IP address "1.2.1.3" of the request source terminal (the terminal 10*aa*) and the IP address "1.3.2.4" of the destination terminal (the terminal 10*db*) extracted in step S46-1 and investigates whether each dot address of the IP addresses "1.2.1.2," "1.2.2.2," and "1.3.2.2" of the relay devices 30*a*, 30*b*, and 30*d* selected in step S46-2 is the same as or different from each dot address in the IP addresses "1.2.1.3" and "1.3.2.4" of the request source terminal (the terminal 10*aa*) and the destination terminal (the terminal 10*db*) (step S46-3).

Next, a priority deciding unit 57*c* decides the point of the address priority for each of the relay devices 30*a*, 30*b*, and 30*d* investigated in step S46-3 with reference to the priority management DB 5006 (see FIG. 16) (step S46-4). The result of the deciding process can be expressed as a table as illustrated in FIG. 23. FIG. 23 is a view illustrating a point calculation state of the priority when performing the narrowing process of the relay device 30. In FIG. 23, the point of the address priority, the point of the transmission rate priority, and the integrated point are illustrated for every relay device ID. The point of the address priority includes the point of each relay device 30 on the request source terminal (the terminal 10*aa*) and the point on the destination terminal (the terminal 10*db*). The integrated point is a sum of a higher point of the two points of the address priority and the point of the transmission rate priority.

In the present exemplary embodiment, since the IP address "1.2.1.2" of the relay device 30*a* is "same.same.same.different" relative to the IP address "1.2.1.3" of the request source terminal (the terminal 10*aa*), the point of the address priority is "5" as illustrated in FIG. 23. Further, since the IP address "1.2.1.2" of the relay device 30*a* is "same.different.different.different" relative to the IP address "1.3.2.4" of the destination terminal (the terminal 10*db*) as illustrated in FIG. 1, the point of the address priority is "1" as illustrated in FIG. 23. Further, since the IP address "1.2.2.2" of the relay device 30*b* is "same.same.different.different" relative to the IP address "1.2.1.3" of the request source terminal (the terminal 10*aa*), the point of the address priority is "3." Further, since the IP address "1.2.2.2" of the relay device 30*b* is "same.different.same.different" relative to the IP address "1.3.2.4" of the destination terminal (the terminal 10*db*), the point of the address priority is "1." Further, since the IP address "1.3.2.2" of the relay device 30*d* is "same.different.different.different" relative to the IP address "1.2.1.3" of the request source terminal (the terminal 10*aa*), the point of the address priority is "1." Further, since the IP address "1.3.2.2" of the relay device 30*d* is "same.same.same.different" relative to the IP address "1.3.2.4" of the destination terminal (the terminal 10*db*), the point of the address priority is "5."

Next, returning back to FIG. 22, a priority deciding unit 57*d* retrieves the priority management DB 5006 (see FIG. 17) based on the maximum transmission rate of each relay devices 30 managed in the relay device management DB 5001 (see FIG. 11) and decides the point of the transmission rate priority of each of the relay devices 30*a*, 30*b*, and 30*d* narrowed by the primary narrowing process in step S46-2 (step S46-5). In the present exemplary embodiment, since the maximum data transmission rate of the relay device 30*a* is 100 Mbps as illustrated in FIG. 11, the point of the transmission rate priority is "3" by referring to the transmission rate priority illustrated in FIG. 17. Similarly, since the maximum transmission rate of the relay device 30*b* is calculated as 1000 Mbps, the point of the transmission rate priority is "5." Further, similarly, since the maximum transmission rate of the relay device 30*d* is calculated as 10 Mbps, the point of the transmission rate priority is "1."

Next, the primary selecting unit 56*c* selects the two high-order relay devices 30 that are high in integrated point in which the higher point of the terminals 10aa and 10db in the point of the address priority and the point of the transmission rate priority for each of the relay devices 30a, 30b, and 30d (step S46-6) are integrated. In the present exemplary embodiment, since the integrated points of the relay device IDs 111a, 111b, and 111d are "8," "8," and "6," respectively, as illustrated in FIG. 23, the relay device 30a related to the relay device ID "111a" and the relay device 30b related to the relay device ID "111b" are selected.

When the narrowing process in step S46 is completed, the transceiving unit 51 illustrated in FIG. 7 transmits the relay device narrowed-down information for transferring the number of the narrowed relay devices 30 to the destination terminal (the terminal 10db) via the communication terminal 2 (step S47). The relay device narrowed-down information includes "2" as the number of the relay devices 30 narrowed down in step S46, "01aa" as the terminal ID of the request source terminal (the terminal 10aa), and "se1" as the selection session ID. Thus, when executing the session in the selection session ID "se1," the terminal 10db can recognize the number of the relay devices 30 and whether or not there was a request of starting a call from a certain terminal 10 and also recognize the IP address "1.1.1.2" of the management system 50 that is the transmission source of the relay device narrowed-down information.

The terminal 10db transmits reception completion information representing that reception of the relay device narrowed-down information is completed to the management system 50 from the transceiving unit 11 via the communication network 2 (step S48). The reception completion information includes the session ID "se1." Thus, the management system 50 can recognize that transmission of the number of the relay devices being executed through the session ID "se1" is completed and the IP address "1.3.2.4" of the destination terminal (the terminal 10db) that is the transmission source.

Next, a process of selecting the relay device 30 through the destination terminal (the terminal 10db) will be described with reference to FIGS. 24 and 25. In FIG. 24, a variety of management information is transmitted and received through the management information session sei illustrated in FIG. 2.

First, before starting a video conference call, the management system 50 transmits prior relay request information for requesting a relay in advance to each of the relay devices 30a and 30b narrowed down in step S46 (step S61-1 and step S61-2). The prior relay request information includes the session ID "se1," the IP address "1.2.1.3" of the request source terminal (the terminal 10aa), and the IP address "1.3.2.4" of the destination terminal (the terminal 10db). Thus, each of the relay devices 30a and 30b can recognize the selection session, the request source terminal, and the destination terminal and also recognize the IP address "1.1.1.2" of the management system 50 that is the transmission source of the prior relay request information.

Next, each of the relay devices 30a and 30b transmits prior transmission request information, which represents that prior transmission information including a packet Internet groper (ping) which will be described later should be transmitted to each of the relay devices 30a and 30b as its own device before the call start, from the transceiving unit 31 to the request source terminal (the terminal 10aa) recognized in steps S61-1 and S61-2 via the communication network 2 (steps S62-1 and S62-2). The prior transmission information includes the session ID "se1." Thus, the request source terminal (the terminal 10aa) can recognize that the prior transmission information is transmitted to each of the relay devices 30a and 30b in the process of selecting the relay device 30 being executed through the session ID "se1" and the IP addresses "1.2.1.2" and "1.2.2.2" of the relay devices that are the transmission sources of the prior transmission request information.

The reason why the IP address of the destination terminal is not notified from the management system 50 directly to the request source terminal, the IP address of the destination terminal is notified to the relay device 30a as in step S61-1, and the relay device 30a requests the request source terminal to transmit the prior transmission request information to its own device (the relay device 30a) as in step S61-2 is to secure security by not informing each terminal 10 of the IP address of another terminal 10.

Next, the request source terminal (the terminal 10aa) transmits the prior transmission information to each of the relay devices 30a and 30b from the transceiving unit 11 via the communication network 2 (steps S63-1 and S63-2). The prior transmission information is information that is transmitted to the destination terminal (the terminal 10db) through each of the relay devices 30a and 30b prior to the image data and the voice data instead of the image data and the voice data and used for measuring a required time between transmission of the request source terminal (the terminal 10aa) and reception of the destination terminal (the terminal 10db). The prior transmission information includes a ping for checking whether or not the request source terminal (the terminal 10aa), the relay devices 30a and 30b, and the destination terminal (the terminal 10db) are connected to be capable of performing communications, the transmission date and time in which the prior transmission information is transmitted from the request source terminal (the terminal 10aa), and the session ID "se1." Thus, when executing the session through the selection session ID "se1," each of the relay devices 30a and 30b can recognize that the prior transmission information is received, and at the same time, recognize the IP address "1.2.1.3" of the request source terminal (the terminal 10aa) that is the transmission source of the prior transmission information.

Next, each of the relay devices 30a and 30b relays the prior transmission information to the IP address "1.3.2.4" of the destination terminal (the terminal 10db) included in the prior relay request information received in step S61-1 and step S61-2 (step S64-1 and step S64-2). Thus, when executing the session in the session ID "se1," the destination terminal (the terminal 10db) can recognize that the prior transmission information is received, and at the same time, recognize the IP addresses "1.2.1.2" and "1.2.2.2" of the relay devices 30a and 30b that are the transmission sources (the relay sources) of the prior transmission information.

Next, the final narrowing unit 16 of the destination terminal (the terminal 10db) narrows down one relay device 30 that finally relays the image data and the voice data in the video conference call based on the prior transmission information (step S65).

The process in step S65 will be described in further detail with reference to FIGS. 8 and 25. First, the measuring unit 16a of the final narrowing unit 16 illustrated in FIG. 8 measures the reception date and time in which each piece of the prior transmission information relayed by each of the relay devices 30a and 30b is received by the transceiving unit 11 of the terminal 10db (step S65-1). Next, the calculating unit 16b calculates the required time between transmission and reception of each piece of the prior transmission information based on the difference between the reception date and time of each piece of the prior transmission information in which the reception time is measured and the transmission date and time included in the prior transmission information (step S65-2). Next, when executing the session in the session ID "se1," the final selecting unit 16c determines whether or not all of as many prior transmission information as the number "2" of the relay devices 30 that are scheduled to relay is received (step S65-3). If all of the prior transmission information is not received yet (NO), the final selecting unit 16*c* determines whether or not a predetermined time (herein, one minute) elapses after the terminal 10*db* receives the prior transmission information (step S65-4). If the predetermined time did not elapse (NO), the process returns to step S65-1. However, if it is determined in step S65-3 that all of the prior transmission information is received (YES) or if it is determined in step S65-4 that the predetermined time elapsed (YES), the final selecting unit 16*c* selects one relay device 30 that relayed the prior transmission information in which the shortest required time is taken among the required times calculated by the calculating unit 16*b* so far (step S65-5). In the present exemplary embodiment, described is an example in which the prior transmission information relayed by the relay device 30*a* is shorter in required time than the prior transmission information relayed by the relay device 30*b*, and thus the relay device 30*a* is selected.

Next, the destination terminal (the terminal 10*db*) transmits selection information representing selection of the relay device 30*a* from the transceiving unit 11 via the communication network 2 (step S66). The selection information includes the session ID "se1" and the relay device ID "111a" of the selected relay device 30*a*. Thus, the management system 50 can recognize that the relay device 30*a* is selected, and at the same time, recognize the IP address "1.3.2.4" of the destination terminal (the terminal 10*db*) that is the transmission source of the selection information.

Next, the session managing unit 57 of the management system 50 stores and manages the relay device ID "111a" of the finally selected one relay device 30*a* in the field part of the relay device ID of the record including the session ID "se1" in the session management table of the session management DB 5005 (see FIG. 15) (step S67). The transceiving unit 51 of the management system 50 transmits relay start request information representing the start of the relay to the relay device 30*a* via the communication network 2 (step S68). The relay start request information includes the IP addresses "1.2.1.3" and "1.3.2.4" of the request source terminal (the terminal 10*aa*) to be relayed and the destination terminal (the terminal 10*db*). Thus, since it is possible to recognize that the relay device 30*a* that is its own device is selected, the relay device 30*a* establishes a session for transmitting and receiving the three items of image data including the low resolution, the intermediate resolution, and the high resolution and the voice data between the terminals 10*aa* and 10*db* (step S69). Thus, the terminals 10*aa* and 10*db* can start the video conference call.

As the management system 50 transmits the relay device narrowed-down information to the destination terminal (the terminal 10*db*) in step S47, the destination terminal (the terminal 10*db*) side performs the process (step S65) of selecting the relay device through step S48 to step S64-1 and step S64-2. However, the present invention is not limited thereto, and as the management system 50 transmits the relay device narrowed-down information to the request source terminal (the terminal 10*aa*) in step S47, the transmission source and the reception source of each information may be replaced with the request source terminal (the terminal 10*aa*) and the destination terminal (the terminal 10*db*) until step S64-1 and step S64-2. Thus, the request source terminal (the terminal 10*aa*) may perform the process of selecting the relay device instead of step S65 and perform transmission of the selection information instead of step S66.

Subsequently, a process of transmitting and receiving the image data and the voice data to perform the video conference call between the request source terminal and the destination terminal will be described with reference to FIGS. 7 and 26. In one direction process in which the image data and the voice data are transmitted from the terminal 10*aa* to the terminal 10*db* and in a reverse direction process in which the image data and the voice data are transmitted from the terminal 10*db* to the terminal 10*aa*, transmission and reception of the image data and the voice data or detection of the delay time which will be described later are the same process. Thus, one direction communication will be described, and a description of the reverse direction communication will be omitted.

First, the request source terminal (the terminal 10*aa*) transmits image data of a subject whose image is captured by an image capturing unit 14*a* and voice data of a voice input by the voice input unit 15*a* from the transceiving unit 11 to the relay device 30*a* via the communication network 2 through an image/voice data session sed illustrated in FIG. 2 (step S81). In the present exemplary embodiment, the high quality image data including the low resolution, the intermediate resolution, and the high resolution and the voice data illustrated in FIGS. 3A to 3C are transmitted. Thus, the relay device 30*a* receives the image data of the three resolutions and the voice data through the transceiving unit 31. The data quality confirming unit 33 confirms the image quality of the image data to be relayed by retrieving the quality change management DB 3001 (see FIG. 10) by using the IP address "1.3.2.4" of the destination terminal (the terminal 10*db*) as the retrieval key and extracting the corresponding image quality of the image data to be relayed (step S82). In the present exemplary embodiment, since the confirmed image quality of the image data is the "high image quality" and is the same as the image quality of the image data received by the transceiving unit 31, the relay device 30*a* transmits the image data having the same image quality and the voice data having the same sound quality to the destination terminal (the terminal 10*db*) "as is" through the image/voice data session sed (step S83). Thus, the destination terminal (the terminal 10*db*) receives the high quality image data including the low resolution, the intermediate resolution, and the high resolution and the voice data through the transceiving unit 11. The display control unit 17 combines the image data of the three image qualities and displays the image on the display 120, and the voice output unit 15*b* outputs a voice based on the voice data.

Next, the delay detecting unit 18 of the terminal 10*db* detects the reception delay time of the image data received by the transceiving unit 11 at a predetermined time interval (for example, at an interval of one second) (step S84). In the present exemplary embodiment, a description will be made in connection with a case in which the delay time is 200 ms.

The transceiving unit 11 of the destination terminal (the terminal 10*db*) transmits the delay information representing the delay time "200 ms" to the management system 50 through the management information session sei via the communication network 2 (step S85). Thus, the management system 50 can recognize the delay time and the IP address "1.3.2.4" of the terminal 10*db* that is the transmission source of the delay information.

Next, the delay time managing unit 60 of the management system 50 retrieves the terminal management DB 5003 (see FIG. 13) by using the IP address "1.3.2.4" of the destination terminal (the terminal 10*db*) as the retrieval key and extracts the corresponding terminal ID "01db." The delay time managing unit 60 stores and manages the delay time "200 ms" represented by the delay information in the delay time field part in the record of the terminal ID "01db" in the session management table of the session management DB 5005 (see FIG. 15) (step S86).

Next, the quality deciding unit 58 decides the "intermediate image quality" as the image quality by retrieving the quality management DB 5007 (see FIG. 18) by using the delay time "200 ms" as the retrieval key and extracting the "intermediate image quality" as the image quality of the corresponding image data (step S87).

Next, the transceiving unit 51 retrieves the relay device management DB 5001 (see FIG. 11) by using the relay device ID "111a" related to the terminal ID "01db" in the session management table of the session management DB (see FIG. 15) as the retrieval key and extracts the IP address "1.2.1.2" of the corresponding relay device 30a (step S88). The transceiving unit 51 transmits the quality information representing the "intermediate image quality" as the image quality decided in step S87 to the relay device 30a through the management information session sei illustrated in FIG. 2 via the communication network 2 (step S89). The quality information includes the IP address "1.3.2.4" of the destination terminal (the terminal 10db) used as the retrieval key in step S86. Thus, the quality change managing unit 34 in the relay device 30a stores and manages the IP address "1.3.2.4" of the terminal 10 (here, the terminal 10db) of the transmission destination and the "intermediate image quality" as the image quality of the image data to be relayed in the quality change management DB 3001 (see FIG. 10) (step S90) in association with each other.

Subsequently, the terminal 10aa transmits the high quality image data including the low resolution, the intermediate resolution, and the high resolution and the voice data to the relay device 30 through the voice/image data session sed similarly to step S81 (step S91). Similarly to step S82, in the relay device 30a, the data quality confirming unit 33 confirms the image quality of the image data to be relayed by retrieving the quality change management DB 3001 (see FIG. 10) by using the IP address "1.3.2.4" of the destination terminal (the terminal 10db) as the retrieval key and extracting the "intermediate image quality" as the corresponding image quality of the image data to be relayed (step S92). In the present exemplary embodiment, since the confirmed image quality of the image data is the "intermediate image quality" and is lower than the image quality of the image data received by the transceiving unit 31, the data quality changing unit 35 changes the image quality of the image data by reducing the image quality of the image data from the "high image quality" to the "intermediate image quality" (step S93).

The transceiving unit 31 transmits the image data in which the image quality of the image data was changed to the "intermediate image quality" and the voice data whose sound quality did not change to the terminal 10db through the image/voice data session sed via the communication network 2 (step S94). Thus, the destination terminal (the terminal 10db) receives the high quality image data including the low resolution and the intermediate resolution and the voice data through the transceiving unit 11. The display control unit 17 combines the image data of the two image resolutions and displays the image on the display 120, and the voice output unit 15b outputs a voice based on the voice data.

If the reception delay occurs in the destination terminal (the terminal 10db) that receives the image data as described above, the relay device 30a changes the image quality without giving an uncomfortable feeling to a person who participates in the video conference.

Main Effects of the Present Exemplary Embodiment

As described above, according to the present exemplary embodiment, since it is difficult to grasp the whole environment of the Internet 2i even though it is possible to grasp the LAN environment such as the IP address of the relay device 30 in the communication network 2, the plurality of relay devices 30 that relay the image data and the voice data are narrowed down to two relay devices based on the environment information that can be grasped. Next, by transmitting and receiving the prior transmission information instead of the image data and the voice data before actually transmitting and receiving the image data and the voice data between the plurality of terminals 10, there is an effect of being capable of narrowing the replay devices 30 down to one replay device which can actually relay the prior transmission information most rapidly.

That is, by selecting the relay devices 30 that are respectively allocated two high-order addresses closes to any one of the IP addresses of the terminals 10, the two relay devices 30 remain as candidates to be finally used. Thereafter, by actually transmitting the prior transmission information between the request source terminal and the destination terminal through each of the candidate relay devices 30, the two candidate relay devices 30 can be narrowed down to the relay device 30 that relayed the prior transmission information with the shortest required time taken in transmission and reception. Thus, there is an effect of being capable of realizing transmission and reception of the image data or the voice data with as high quality as possible in the environment of the present communication network 2.

Further, in the present exemplary embodiment, when narrowing down the relay devices 30, the relay device 30 having the IP address close to the IP address of the terminal 10 that performs the video conference is first selected, and the two or more relay devices 30 are selected in view of the maximum data transmission rate in each of the relay devices 30. Thus, there is an effect of being capable of narrowing the candidates of the relay devices according to the environment of the present communication network 2.

Further, in the present exemplary embodiment, when narrowing down the relay devices 30, the relay device 30 whose operation state is "on line" is selected. Thus, the candidate of the relay device 30 more suitable for the environment of the present communication network 2 can be selected.

Second Embodiment

Hereinafter, a second exemplary embodiment of the present invention will be described with reference to FIG. 27. FIG. 27 is a sequence diagram illustrating a process of selecting the relay device at the terminal according to the second exemplary embodiment of the present invention. The present exemplary embodiment is different from the first exemplary embodiment in a process or operation in FIGS. 27 and 24, and thus a description will be made below in connection with the differences in a process or operation.

A Process or Operation of the Exemplary Embodiment

In step S61-1, step S62-1, step S61-2, and step S62-2 in FIG. 24 of the first exemplary embodiment, it is required that the management system 50 transmits the prior request information to the request source terminal (the terminal 10aa) through each of the relay devices 30a and 30b, whereas in the present exemplary embodiment, the management system 50 transmits the prior request information directly to the request source terminal (the terminal 10aa).

That is, in the present exemplary embodiment, as illustrated in FIG. 27, the management system 50 first transmits the prior transmission request information to the request source terminal (the terminal 10aa) (step S161). In this case, the prior transmission request information includes the session ID "se1," the IP addresses "1.2.1.2" and "1.2.2.2" of the primary-narrowed relay devices 30a and 30b and the IP address "1.3.2.4" of the destination terminal (the terminal 10db). Thus, the request source terminal (the terminal 10aa) can recognize the selection session, the relay device 30 as the candidate finally narrowed by primary narrowing, and the IP address of the destination terminal (the terminal 10db). Further, the request source terminal (the terminal 10aa) can recognize the IP address "1.1.1.2" of the management system 50 that is the transmission source of the prior transmission request information.

Next, the request source terminal (the terminal 10aa) transmits the prior transmission information to the relay devices 30a and 30b (step S162-1 and step S162-2). Similarly to step S63-1 and step S63-2 in the first exemplary embodiment, the prior transmission information includes not only the ping, the transmission date and time in which the prior transmission information is transmitted from the request source terminal (the terminal 10aa), and the session ID "se1" but also the IP address "1.3.2.4" of the destination terminal (the terminal 10db). Thus, each of the relay devices 30a and 30b can recognize that the prior transmission information is received in execution of the session in the selection session ID "se1," and at the same time, recognize the IP address "1.2.1.3" of the request source terminal (the terminal 10aa) that is the transmission source of the prior transmission information. Further, the IP address "1.3.2.4" of the destination terminal (the terminal 10db) that is the transmission destination of the prior transmission information can be recognized. Thus, each of the relay devices 30a and 30b can transmit (or transfer) the prior transmission information to the acquired IP address of the destination terminal (the terminal 10db).

Further, step S163-1, step S163-2 to step S168 in FIG. 27 are the same processes as in step S64-1 and step S64-2 to step S69 of FIG. 24 in the first exemplary embodiment, and thus a description thereof will not be repeated.

Main Effects of the Present Exemplary Embodiment

As described above, according to the present exemplary embodiment, the same effects as the main effects in the first exemplary embodiment are obtained.

However, since the request source terminal is informed of the IP address of the destination terminal, the present exemplary embodiment is inferior in security aspect to the first exemplary embodiment. For example, however, in the first exemplary embodiment, when a firewall is installed to secure confidentiality of the LAN 2a illustrated in FIG. 1, there is a case in which the prior transmission request information in step S62-2 cannot be transmitted from the relay device 30b to the request source terminal (the terminal 10aa). On the other hand, in the present exemplary embodiment, since one which transmits the prior transmission request information to the request source terminal is not the relay device 30 side, there does not occur a problem in that the prior transmission request information cannot be transmitted. Further, in this case, the management system 50 is on the communication network outside the firewall, but a connection between the terminal 10aa and the management system 50 is already established, as illustrated in FIG. 20, so that the management system 50 can transmit the prior transmission request information to the terminal 10aa through the firewall.

Supplemental Embodiment

The relay device 30, the management system 50, the program providing system 90, and the maintenance system 100 of the exemplary embodiments may be constructed by a single computer or each unit (function or means) thereof may be divided and constructed by a plurality of arbitrarily allocated computers. If the program providing system 90 is constructed by a single computer, a program to be transmitted by the program providing system may be divided into a plurality of modules and then transmitted or may be transmitted without being divided. If the program providing system 90 is constructed by a plurality of computers, transmission from each of the computers may be performed in a state in which a plurality of modules is divided.

All of the recording medium such as a CD-ROM storing the terminal program, the relay device program, or the transmission management program of the exemplary embodiments, the HD 204 storing the programs, and the program providing system 90 having the HD 204 are program products and are used in the case in which the terminal program, the relay device program, and the transmission management program are provided to the users within the country and abroad.

Further, in the exemplary embodiments, management is performed focusing on the resolution of the image of the image data as an example of the image quality of the image data to be relayed by the relay device 30 according to the quality change management table illustrated in FIG. 10 and the quality management table illustrated in FIG. 18. However, the present invention is not limited thereto, and management may be performed focusing on the depth of the image quality of the image data, the sampling frequency in a voice of the voice data, or the bit length in a voice of the voice data as another example. Further, the voice data may be divided into data of three kinds of resolutions (high resolution, intermediate resolution, and low resolution) and then transmitted.

Further, in FIGS. 11, 13, and 15, the reception date and time is managed. However, the present invention is not limited thereto, and at least the reception time of the reception date and time is preferably managed.

Further, in the exemplary embodiment, the IP address of the relay device and the IP address of the terminal are managed in FIGS. 11 and 13, respectively. However, the present invention is not limited thereto, and in the case of relay device-specifying information for specifying the relay device 30 in the communication network 2 or terminal-specifying information for specifying the terminal 10 in the communication network 2, a fully qualified domain name (FQDN) may be managed. In this case, an IP address corresponding to the FQDN is acquired by a well known domain name system (DNS) server. Further, "relay device connection destination information representing a connection destination to the relay device 30 in the communication network 3" or "relay device destination information representing a destination to the relay device 30 in the communication network 2" as well as "relay device-specifying information for specifying the relay device 30 in the communication network 2" may be expressed. Similarly, "terminal connection destination information representing a connection destination to the terminal 10 in the communication network 3" or "terminal destination information representing a destination to the terminal 10 in the communication network 2" as well as "terminal-specifying information for specifying the terminal 10 in the communication network 2" may be expressed.

Further, in the exemplary embodiment, the video conference system is described as an example of the transmission system 1. However, the present invention is not limited thereto, and a telephone system such as an IP telephone or an Internet telephone may be used. Further, as the transmission system 1, a car navigation system may be used. In this case, for example, one of the terminals 10 corresponds to a car navigation device mounted in an automobile, and the other of the terminals 10 corresponds to a management terminal or a management server of a management center that manages car navigation or a car navigation device mounted in another automobile. Further, the transmission system 1 may be a cellular phone communication system. In this case, for example, the terminal 10 corresponds to a cellular phone.

Further, in the exemplary embodiment, the image data and the voice data are described as an example of contents data. However, the present invention is not limited thereto, and touch data may be used. In this case, a sense of touch caused by the user in one terminal is transmitted to the other terminal. Further, as the contents data, smell data may be used. In this case, smell of one terminal is transmitted to the other terminal. Further, as the contents data, at least one of the image data, the voice data, the touch data, and the smell data is preferably used.

Further, in the exemplary embodiment, the case in which the video conference is held by the transmission system 1 is described. However, the present invention is not limited thereto and may be used in a meeting, a general conversation with families or friends, or giving information in one direction.

The invention claimed is:

1. A transmission terminal that transmits and receives content data to and from another transmission terminal through a predetermined relay device that relays the content data, the transmission terminal comprising:
   a receiver to receive a plurality of pieces of prior transmission information that are transmitted from the another transmission terminal before the content data is transmitted, and are respectively relayed through a plurality of relay devices, each piece of prior transmission information including a transmission time when transmitted from the another transmission terminal and including relay device identification information indicating a relay device that has relayed the prior transmission information among the plurality of relay devices;
   a processing circuit to
      measure a reception time of each piece of prior transmission information,
      calculate, for each piece of prior transmission information whose reception time has been measured, a time between transmission and reception of the prior transmission information based on a difference between the measured reception time and the transmission time included in the prior transmission information, and
      select a relay device that is represented by the relay device identification information included in the prior transmission information corresponding to the shortest time among the calculated times, and
   a transmitter to transmit the content data to the another transmission terminal through the selected relay device.

2. The transmission terminal according to claim 1, wherein
   the receiver receives relay device number information that is transmitted from the another transmission terminal and represents the number of relay devices that are scheduled to relay the pieces of prior transmission information, and
   the processing circuit calculates a required time between transmission and reception of each piece of the prior transmission information, the number of which corresponds to the number of the relay devices represented by the received relay device number information.

3. The transmission terminal according to claim 1, wherein
   the receiver receives relay device number information that is transmitted from the another transmission terminal and includes the number of relay devices that are scheduled to relay the pieces of prior transmission information, and
   the processing circuit calculates a required time between transmission and reception of only the prior transmission information received within a predetermined time after the receiver receives the relay device number information.

4. The transmission terminal according to claim 1, wherein the relay device identification information is address information of the relay device.

5. The transmission terminal according to claim 1, wherein the transmission terminal notifies a management system, which manages the transmission terminal and the another transmission terminal, of information of the selected relay device, so as to establish a session for transmitting and receiving the content data with the selected relay device.

6. A transmission method for transmitting and receiving content data to and from another transmission terminal through a predetermined relay device that relays the content data, the method comprising:
   receiving a plurality of pieces of prior transmission information that are transmitted from the another transmission terminal before the content data is transmitted, and are respectively relayed through a plurality of relay devices, each piece of prior transmission information including a transmission time when transmitted from the another transmission terminal and including relay device identification information indicating a relay device that has relayed the prior transmission information among the plurality of relay devices;
   measuring a reception time of each piece of prior transmission information;
   calculating, for each piece of prior transmission information whose reception time has been measured, a time between transmission and reception of the prior transmission information based on a difference between the measured reception time and the transmission time included in the prior transmission information;
   selecting a relay device that is represented by the relay device identification information included in the prior transmission information corresponding to the shortest time among the calculated times; and
   transmitting the content data to the another transmission terminal through the selected relay device.

7. A non-transitory computer readable medium storing a program that, when executed by a processor, causes the processor to execute a transmission method for transmitting and receiving content data to and from another transmission terminal through a predetermined relay device that relays the content data, the method comprising:
   receiving a plurality of pieces of prior transmission information that are transmitted from the another transmission terminal before the content data is transmitted, and are respectively relayed through a plurality of relay devices, each piece of prior transmission information including a transmission time when transmitted from the another transmission terminal and including relay device identification information indicating a relay device that has relayed the prior transmission information among the plurality of relay devices;
   measuring a reception time of each piece of prior transmission information;
   calculating, for each piece of prior transmission information whose reception time has been measured, a time between transmission and reception of the prior transmission information based on a difference between the measured reception time and the transmission time included in the prior transmission information;

selecting a relay device that is represented by the relay device identification information included in the prior transmission information corresponding to the shortest time among the calculated times; and transmitting the content data to the another transmission terminal through the selected relay device.

8. A transmission system, comprising:

a transmission terminal;

another transmission terminal; and a plurality of relay devices, wherein the transmission terminal transmits and receives content data to and from the another transmission terminal through a predetermined relay device that relays the content data, the transmission terminal including a receiver to receive a plurality of pieces of prior transmission information that are transmitted from the another transmission terminal before the content data is transmitted, and are respectively relayed through the plurality of relay devices, each piece of prior transmission information including a transmission time when transmitted from the another transmission terminal and including relay device identification information indicating a relay device that has relayed the prior transmission information among the plurality of relay devices;

a processing circuit to measure a reception time of each piece of prior transmission information, calculate, for each piece of prior transmission information whose reception time has been measured, a time between transmission and reception of the prior transmission information based on a difference between the measured reception time and the transmission time included in the prior transmission information, and select a relay device that is represented by the relay device identification information included in the prior transmission information corresponding to the shortest time among the calculated times, and a transmitter to transmit the content data to the another transmission terminal through the selected relay device.

* * * * *